US012014841B2

(12) United States Patent
Okoniewski et al.

(10) Patent No.: US 12,014,841 B2
(45) **Date of Patent: *Jun. 18, 2024**

(54) APPARATUS AND METHODS FOR ENHANCING A COAXIAL LINE

(71) Applicant: Acceleware Ltd., Calgary (CA)

(72) Inventors: Michal M. Okoniewski, Calgary (CA); Lynn P. Tessier, Eckville (CA); Thomas Apperley, Calgary (CA); Damir Pasalic, Calgary (CA)

(73) Assignee: Acceleware Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,677

(22) Filed: Jun. 8, 2022

(65) Prior Publication Data

US 2022/0301743 A1 Sep. 22, 2022

Related U.S. Application Data

(63) Continuation of application No. 16/767,752, filed as application No. PCT/CA2018/051620 on Dec. 19, 2018, now Pat. No. 11,410,796.

(Continued)

(51) Int. Cl.
*H01B 11/18* (2006.01)

(52) U.S. Cl.
CPC .................................... *H01B 11/18* (2013.01)

(58) Field of Classification Search
CPC ............ H01B 11/06; H01B 11/18; H01B 9/04

(Continued)

(56) References Cited

U.S. PATENT DOCUMENTS

| | | | |
|---|---|---|---|
| 2,035,274 | A | 3/1936 | Mougey |
| 2,556,244 | A | 6/1951 | Weston |

(Continued)

FOREIGN PATENT DOCUMENTS

| | | |
|---|---|---|
| CA | 2346546 C | 11/2004 |
| CA | 2609762 A1 | 12/2006 |

(Continued)

OTHER PUBLICATIONS

International Search Report and Written Opinion dated Jan. 24, 2019 in corresponding International Patent Application No. PCT/CA2018/051620. (8 pages).

(Continued)

*Primary Examiner* — Chau N Nguyen
(74) *Attorney, Agent, or Firm* — BERESKIN & PARR LLP/S.E.N.C.R.L. s.r.l; Isis E. Caulder; Maria Wei

(57) ABSTRACT

An apparatus for a coaxial transmission line is provided. The apparatus can include a dielectric member having an inner surface defining a bore along a longitudinal axis of an inner conductor of the coaxial transmission line; and a first conductive member mounted axially around the dielectric member and extending along the longitudinal axis. A cross-section of an outer surface of the first conductive member can define a first perimeter. A cross-section of an inner surface of the outer conductor of the coaxial transmission line can define a second perimeter. The first perimeter can be smaller than the second perimeter and thereby provide clearance between a portion of the outer surface of the first conductive member and the inner surface of the outer conductor of the coaxial transmission line when the apparatus is positioned in an annulus defined by the inner conductor and the outer conductor of the coaxial transmission line.

20 Claims, 22 Drawing Sheets

Related U.S. Application Data

(60) Provisional application No. 62/608,727, filed on Dec. 21, 2017.

(58) Field of Classification Search
USPC ............................................................ 174/28
See application file for complete search history.

(56) References Cited

U.S. PATENT DOCUMENTS

| | | | | |
|---|---|---|---|---|
| 2,757,738 | A | 8/1956 | Ritchey | |
| 3,126,438 | A | 3/1964 | Lorrin | |
| 3,169,577 | A | 2/1965 | Sarapuu | |
| 3,170,519 | A | 2/1965 | Haagensen | |
| 3,188,587 | A | 6/1965 | Huber et al. | |
| 3,227,800 | A | 1/1966 | Bondon | |
| 3,249,901 | A | 5/1966 | Spinner | |
| 3,271,506 | A | 9/1966 | Martin et al. | |
| 3,286,015 | A | 11/1966 | Hildebrand et al. | |
| 3,356,785 | A * | 12/1967 | Yoshida | H01B 11/1834 174/99 R |
| 3,514,523 | A | 5/1970 | Hildebrand et al. | |
| 3,522,848 | A | 8/1970 | New | |
| 3,748,373 | A | 7/1973 | Remy | |
| 3,750,058 | A | 7/1973 | Bankert, Jr. et al. | |
| 3,758,700 | A | 9/1973 | Ditscheid | |
| 3,813,481 | A | 5/1974 | Adams | |
| 3,931,451 | A * | 1/1976 | Durschner | H02G 5/068 174/21 C |
| 4,018,977 | A | 4/1977 | Herrmann, Jr. et al. | |
| 4,092,485 | A | 5/1978 | Wanser | |
| 4,132,855 | A | 1/1979 | Clark et al. | |
| 4,135,579 | A | 1/1979 | Rowland et al. | |
| 4,140,179 | A | 2/1979 | Kasevich et al. | |
| 4,140,180 | A | 2/1979 | Bridges et al. | |
| 4,144,935 | A | 3/1979 | Bridges et al. | |
| 4,145,565 | A | 3/1979 | Donon | |
| 4,193,451 | A | 3/1980 | Dauphine | |
| 4,247,136 | A | 1/1981 | Fouss et al. | |
| 4,281,209 | A * | 7/1981 | Yoshioka | H02G 5/065 174/14 R |
| 4,301,865 | A | 11/1981 | Kasevich et al. | |
| 4,319,632 | A | 3/1982 | Marr, Jr. | |
| 4,320,801 | A | 3/1982 | Rowland et al. | |
| 4,449,585 | A | 5/1984 | Bridges et al. | |
| 4,470,459 | A | 9/1984 | Copland | |
| 4,487,257 | A | 12/1984 | Dauphiné | |
| 4,508,168 | A | 4/1985 | Heeren | |
| 4,513,815 | A | 4/1985 | Rundell et al. | |
| 4,554,399 | A * | 11/1985 | Cookson | H02G 5/065 174/14 R |
| 4,583,589 | A | 4/1986 | Kasevich | |
| 4,620,593 | A | 11/1986 | Haagensen | |
| 4,629,222 | A | 12/1986 | Dearden et al. | |
| 4,705,914 | A * | 11/1987 | Bondon | H01B 9/065 174/29 |
| 4,927,189 | A | 5/1990 | Burkit | |
| 5,262,593 | A | 11/1993 | Madry et al. | |
| 5,293,936 | A | 3/1994 | Bridges | |
| 5,467,420 | A | 11/1995 | Rohrmann et al. | |
| 5,742,002 | A | 4/1998 | Arredondo et al. | |
| 6,022,054 | A | 2/2000 | Hemphill et al. | |
| 6,189,611 | B1 | 2/2001 | Kasevich | |
| 6,246,006 | B1 | 6/2001 | Hardin et al. | |
| 6,285,014 | B1 | 9/2001 | Beck et al. | |
| 6,346,671 | B1 | 2/2002 | Ahrens et al. | |
| 6,712,644 | B1 * | 3/2004 | DeCormier | H02G 15/085 333/260 |
| 6,956,164 | B2 | 10/2005 | Brown | |
| 7,075,392 | B2 | 7/2006 | Smith et al. | |
| 7,312,428 | B2 | 12/2007 | Kinzer | |
| 7,674,981 | B1 | 3/2010 | Hesselbarth et al. | |
| 7,817,101 | B2 | 10/2010 | Cowles | |
| 7,891,421 | B2 | 2/2011 | Kasevich | |
| 7,897,874 | B2 | 3/2011 | Park et al. | |
| 8,453,739 | B2 | 6/2013 | Parsche | |
| 8,519,268 | B2 | 8/2013 | Leipold et al. | |
| 8,648,760 | B2 | 2/2014 | Parsche | |
| 8,763,691 | B2 | 7/2014 | Parsche | |
| 8,789,599 | B2 | 7/2014 | Parsche | |
| 8,796,552 | B2 | 8/2014 | Faulkner et al. | |
| 8,847,711 | B2 | 9/2014 | Wright et al. | |
| 9,151,146 | B2 | 10/2015 | Rey-Bethbeder et al. | |
| 9,377,553 | B2 | 6/2016 | Wright et al. | |
| 9,603,656 | B1 | 3/2017 | Germain et al. | |
| 9,765,606 | B2 | 9/2017 | Snow et al. | |
| 9,938,809 | B2 | 4/2018 | Okoniewski et al. | |
| 11,359,473 | B2 | 6/2022 | Okoniewski et al. | |
| 11,410,796 | B2 * | 8/2022 | Okoniewski | E21B 36/04 |
| 2001/0011590 | A1 | 8/2001 | Thomas et al. | |
| 2004/0084442 | A1 | 5/2004 | La Rovere | |
| 2006/0102625 | A1 | 5/2006 | Kinzer | |
| 2007/0252568 | A1 | 11/2007 | Chien | |
| 2009/0173488 | A1 | 7/2009 | Varma | |
| 2009/0178827 | A1 | 7/2009 | Mahlandt et al. | |
| 2011/0006055 | A1 | 1/2011 | Diehl | |
| 2011/0042063 | A1 | 2/2011 | Diehl et al. | |
| 2011/0094755 | A1 | 4/2011 | Corbett et al. | |
| 2011/0146981 | A1 | 6/2011 | Diehl | |
| 2011/0253367 | A1 | 10/2011 | Banerjee et al. | |
| 2011/0303423 | A1 | 12/2011 | Kaminsky et al. | |
| 2012/0018140 | A1 | 1/2012 | Parsche | |
| 2012/0040841 | A1 | 2/2012 | Soika et al. | |
| 2012/0067580 | A1 | 3/2012 | Parsche | |
| 2012/0118565 | A1 | 5/2012 | Trautman et al. | |
| 2012/0125609 | A1 | 5/2012 | Parsche | |
| 2012/0252677 | A1 | 10/2012 | Soika et al. | |
| 2013/0192825 | A1 | 8/2013 | Parsche | |
| 2013/0277045 | A1 | 10/2013 | Parsche | |
| 2013/0334205 | A1 | 12/2013 | Wright et al. | |
| 2014/0131032 | A1 | 5/2014 | Dittmer | |
| 2014/0224472 | A1 | 8/2014 | Parsche | |
| 2014/0262224 | A1 | 9/2014 | Ayers et al. | |
| 2014/0262225 | A1 | 9/2014 | Campbell et al. | |
| 2014/0284102 | A1 | 9/2014 | Ichikawa et al. | |
| 2014/0290934 | A1 | 10/2014 | Parsche | |
| 2014/0300520 | A1 | 10/2014 | Nguyen et al. | |
| 2014/0345904 | A1 | 11/2014 | Nagahashi | |
| 2015/0013967 | A1 | 1/2015 | Parsche | |
| 2015/0070112 | A1 | 3/2015 | Wright et al. | |
| 2015/0192004 | A1 | 7/2015 | Saeedfar | |
| 2015/0211336 | A1 | 7/2015 | Wright et al. | |
| 2015/0276113 | A1 | 10/2015 | Bass et al. | |
| 2016/0047213 | A1 | 2/2016 | Grounds, III et al. | |
| 2016/0097268 | A1 | 4/2016 | Okoniewski | |
| 2016/0356136 | A1 | 12/2016 | Whitney et al. | |
| 2018/0053587 | A1 | 2/2018 | Weiss et al. | |

FOREIGN PATENT DOCUMENTS

| | | | |
|---|---|---|---|
| CA | 2816101 | A1 | 5/2012 |
| CA | 2816297 | A1 | 5/2012 |
| CA | 2895595 | A1 | 12/2015 |
| CA | 3020022 | A1 | 10/2017 |
| EP | 1779938 | A2 | 5/2007 |
| JP | 2015100188 | A | 5/2015 |
| WO | 2008/115359 | A1 | 9/2008 |
| WO | 2012/067769 | A2 | 5/2012 |
| WO | 2016/024197 | A2 | 2/2016 |
| WO | 2016/024198 | A2 | 2/2016 |

OTHER PUBLICATIONS

Wacker, et al., "Electromagnetic Heating for In-Situ Production of Heavy Oil and Bitumen Reservoirs", Society of Petroleum Engineers, 2011, pp. 1-14, Calgary, Canada.

Non-final Office Action and Notice of References Cited dated Jan. 21, 2021 in U.S. Appl. No. 16/767,752 (16 pages).

Final Office Action and Notice of References Cited dated May 18, 2021 in U.S. Appl. No. 16/767,752 (14 pages).

(56) References Cited

OTHER PUBLICATIONS

Non-final Office Action dated Oct. 1, 2021 in U.S. Appl. No. 16/767,752 (9 pages).

* cited by examiner

1810

APPARATUS AND METHODS FOR ENHANCING A COAXIAL LINE

CROSS-REFERENCE TO RELATED APPLICATIONS

This application is a continuation of U.S. patent application Ser. No. 16/767,752 filed on May 28, 2020, which is a 35 U.S.C. § 371 national stage entry of International Application No. PCT/CA2018/051620 filed on Dec. 19, 2018, which claims the benefit of U.S. Provisional Patent Application No. 62/608,727 filed on Dec. 21, 2017. The complete disclosures of U.S. application Ser. No. 16/767,752, International App. No. PCT/CA2018/051620, and U.S. App. No. 62/608,727 are hereby incorporated by reference for all purposes.

FIELD

The embodiments described herein relate to transmission lines, and in particular to apparatus and methods of providing coaxial transmission lines.

BACKGROUND

Electromagnetic (EM) heating can be used for enhanced recovery of hydrocarbons from underground reservoirs. Similar to traditional steam-based technologies, the application of EM energy to heat hydrocarbon formations can reduce viscosity and mobilize bitumen and heavy oil within the hydrocarbon formation for production. Hydrocarbon formations can include heavy oil formations, oil sands, tar sands, carbonate formations, shale oil formations, and any other hydrocarbon bearing formations, or any other mineral.

EM heating of hydrocarbon formations can be achieved by using an EM radiator, or antenna, applicator, or lossy transmission line positioned inside an underground reservoir to radiate, or couple, EM energy to the hydrocarbon formation. To carry EM power from a radio frequency (RF) generator to the antenna, transmission lines capable of delivering high EM power over long distances is required. Furthermore, such transmission lines must be capable of withstanding harsh environments (e.g., such as high pressure and temperature) usually found within underground oil wells.

To transmit RF signals or power, the most common transmission line is a coaxial transmission line. Coaxial transmission lines are commercially-available, and capable of delivering power or signals over long distances. Coaxial transmission lines are well-known in applications including communications, radar, electronic and industrial applications. These applications however involve delivering low or medium power in environments having lower pressure and temperature than those usually found within underground oil wells. For high power transmission at ultra-high frequencies (UHF) or microwaves, other options such as rectangular or circular waveguides are available. These options are often impractical however, since at lower frequencies, rectangular and circular waveguides are generally too physically large to be used, a particularly critical feature when transmitting RF power underground.

The use of coaxial transmission lines in special environments, namely for EM heating of underground hydrocarbon formations, can present various challenges that require additional design and materials.

First, transmission lines that are deployed in underground wells have limited cross-sectional diameters. Second, underground oil wells can be warm or hot, and typically, their natural cooling mechanisms (e.g., air circulation around the surface cables) are not available. Third, transmission lines can be deployed in harsh environments, including high pressure and high temperature (e.g., changing with depth, and varying with time) and may be exposed to a variety of fluids.

In addition, transmission lines must withstand mechanical stresses of deployment and construction and site assembly. Also, because of the limited cross-sectional diameters of underground oil wells and the need for high power, a cable must be able to handle high voltages. That is, the dielectric breakdown of the material(s) forming the cable must be taken into consideration. Additionally, large currents can lead to excessive heating, particularly from the inner conductor of the coaxial transmission line, where the surface current densities are the greatest, which also needs to be taken into consideration.

Furthermore, inner conductors of the coaxial transmission line need to be supported by centralizers that, beyond their centralizing function, must facilitate deployment, and possibly transfer heat from the inner conductor to the outer conductor. Furthermore, the centralizers must allow for the flow of fluids in the coaxial transmission line, for example, as cooling agents or pressurizing agents. Finally, because of the high-energy density of the transmission line, and high values of electric fields, arcing prevention needs to be considered.

SUMMARY

The various embodiments described herein generally relate to apparatus (and associated methods to provide the apparatus) for coaxial transmission lines. Coaxial lines have an outer conductor surrounding an inner conductor along a longitudinal axis of the inner conductor. The apparatus includes a dielectric member having an inner surface defining a bore along the longitudinal axis; and a first conductive member mounted axially around the dielectric member. The first conductive member can extend along the longitudinal axis thereby having a first end and a second end. The first conductive member can have an outer surface and a cross-section of the outer surface of the first conductive member that is orthogonal to the longitudinal axis can define a first perimeter. A cross-section of an inner surface of the outer conductor of the coaxial transmission line that is orthogonal to the longitudinal axis can define a second perimeter. The first perimeter can be smaller than the second perimeter and thereby provide clearance along the longitudinal axis between a portion of the outer surface of the first conductive member and the inner surface of the outer conductor of the coaxial transmission line when the apparatus is positioned in an annulus defined by the inner conductor and the outer conductor of the coaxial transmission line.

In at least one embodiment, the dielectric member can be ring shaped.

In at least one embodiment, the first conductive member can be ring shaped.

In at least one embodiment, the dielectric member can include a plurality of layers.

In at least one embodiment, dielectric member has a thermal conductivity between about 0.1 and about 2000 Watts per meter-Kelvin (W/m·K).

In at least one embodiment, the dielectric member has a dielectric constant between about 1 and about 10.

In at least one embodiment, the dielectric member can have a dielectric strength of at least 9 megavolts per meter (MV/m).

In at least one embodiment, the first conductive member can have a conductivity of at least 1E7 Siemens per meter (S/m).

In at least one embodiment, the first conductive member can be non-magnetic.

In at least one embodiment, the first conductive member can be formed of a material having substantially greater hardness than the outer conductor of the coaxial transmission line.

In at least one embodiment, the first conductive member can include at least one of: a plurality of conductive layers and cladding on at least one of the inner surface and the outer surface of the first conductive member.

In at least one embodiment, an end face of the dielectric member can be substantially orthogonal to the longitudinal axis.

In at least one embodiment, at least one of the first end and the second end of the first conductive member can be flush with the end face of the dielectric member.

In at least one embodiment, at least one of the first end and the second end of the first conductive member can include round edges.

In at least one embodiment, at least one of the first end and the second end of the first conductive member can include a rim protruding towards the dielectric member.

In at least one embodiment, the first conductive member being mounted axially around the dielectric member can involve an interference fit.

In at least one embodiment, the apparatus can further include an adhesive for mounting the first conductive member axially around the dielectric member.

In at least one embodiment, the apparatus can further include at least one contact member mounted laterally on the outer surface of the first conductive member for maintaining contact with the inner surface of the outer conductor of the coaxial transmission line when the apparatus can be positioned in an annulus defined by the inner conductor and the outer conductor of the coaxial transmission line.

In at least one embodiment, the apparatus can further include a second conductive member lining the inner surface of the dielectric member.

In at least one embodiment, the second conductive member can be formed of a material having substantially greater hardness than the inner conductor of the coaxial transmission line.

In at least one embodiment, the second conductive member can be a tube.

In at least one embodiment, the second conductive member can include cladding on at least one of an inner surface and an outer surface of the second conductive member.

In at least one embodiment, an inner surface of the second conductive member can include threading complementary to threading on an outer surface of the inner conductor of the coaxial transmission line.

In another broad aspect, a method of providing a coaxial transmission line is described. A coaxial transmission line can have an outer conductor surrounding an inner conductor along a longitudinal axis of the inner conductor. The method can involve providing a dielectric member having an inner surface defining a bore along the longitudinal axis; mounting a first conductive member axially around the dielectric member to provide a first apparatus, and positioning the first apparatus in an annulus defined by the inner conductor and the outer conductor of the coaxial transmission line. The first conductive member can have an outer surface and a cross-section of the outer surface of the first conductive member that is orthogonal to the longitudinal axis can define a first perimeter. A cross-section of an inner surface of the outer conductor of the coaxial transmission line that is orthogonal to the longitudinal axis can define a second perimeter. The first perimeter can be smaller than the second perimeter and thereby provide clearance along the longitudinal axis between a portion of the outer surface of the first conductive member and the inner surface of the outer conductor of the coaxial transmission line.

In at least one embodiment, the positioning the first apparatus in an annulus defined by the inner conductor and the outer conductor of the coaxial transmission line includes mounting the first apparatus around the inner conductor of the coaxial transmission line; and inserting the inner conductor of the coaxial transmission line, with the first apparatus mounted thereon, in the outer conductor of the coaxial transmission line.

In at least one embodiment, mounting the first apparatus around the inner conductor of the coaxial transmission line involves rotating the first apparatus with respect to the inner conductor of the coaxial transmission such that threading on the inner surface of the dielectric member engages with complementary threading on an outer surface of the inner conductor of the coaxial transmission line.

In at least one embodiment, the method can further include lining the inner surface of the dielectric member with a second conductive member.

In at least one embodiment, mounting the first apparatus around the inner conductor of the coaxial transmission line involves rotating the first apparatus with respect to the inner conductor of the coaxial transmission such that threading on the inner surface of the second conductive member engages with complementary threading on an outer surface of the inner conductor of the coaxial transmission line.

In at least one embodiment, mounting a first conductive member axially around the dielectric member involves positioning the first conductive member around the dielectric member; and wrapping the first conductive member around the dielectric member by at least one of shrink-heating and interference fitting.

In at least one embodiment, mounting a first conductive member axially around the dielectric member includes applying an adhesive between the first conductive member and the dielectric member.

In at least one embodiment, the method includes mounting at least one contact member laterally on the outer surface of the first conductive member prior to positioning the first apparatus in an annulus defined by the inner conductor and the outer conductor of the coaxial transmission line.

In another broad aspect, a coaxial transmission line is described. The coaxial transmission line includes an inner conductor section defining a longitudinal axis; a dielectric member mounted around a portion of the inner conductor section along the longitudinal axis; a first conductive member mounted axially around the dielectric member, and an outer conductor section. The first conductive member can have an outer surface and a cross-section of the outer surface of the first conductive member that is orthogonal to the longitudinal axis can define a first perimeter. The outer conductor section can have an inner surface defining a bore through which the first conductive member can be inserted. A cross-section of the inner surface of the outer conductor section that is orthogonal to the longitudinal axis can define a second perimeter. The first perimeter can be smaller than the second perimeter and thereby provide clearance along the longitudinal axis between a portion of the outer surface of the first conductive member and the inner surface of the outer conductor of the coaxial transmission line when the first conductive member is inserted through the bore.

In at least one embodiment, the inner conductor section can include a first end portion, a middle portion, and a second end portion. The dielectric member can be mounted around the middle portion. The middle portion can have a first diameter. Each of the first end portion and the second end portion can include a frustum having a minimum diameter that is larger than the first diameter.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
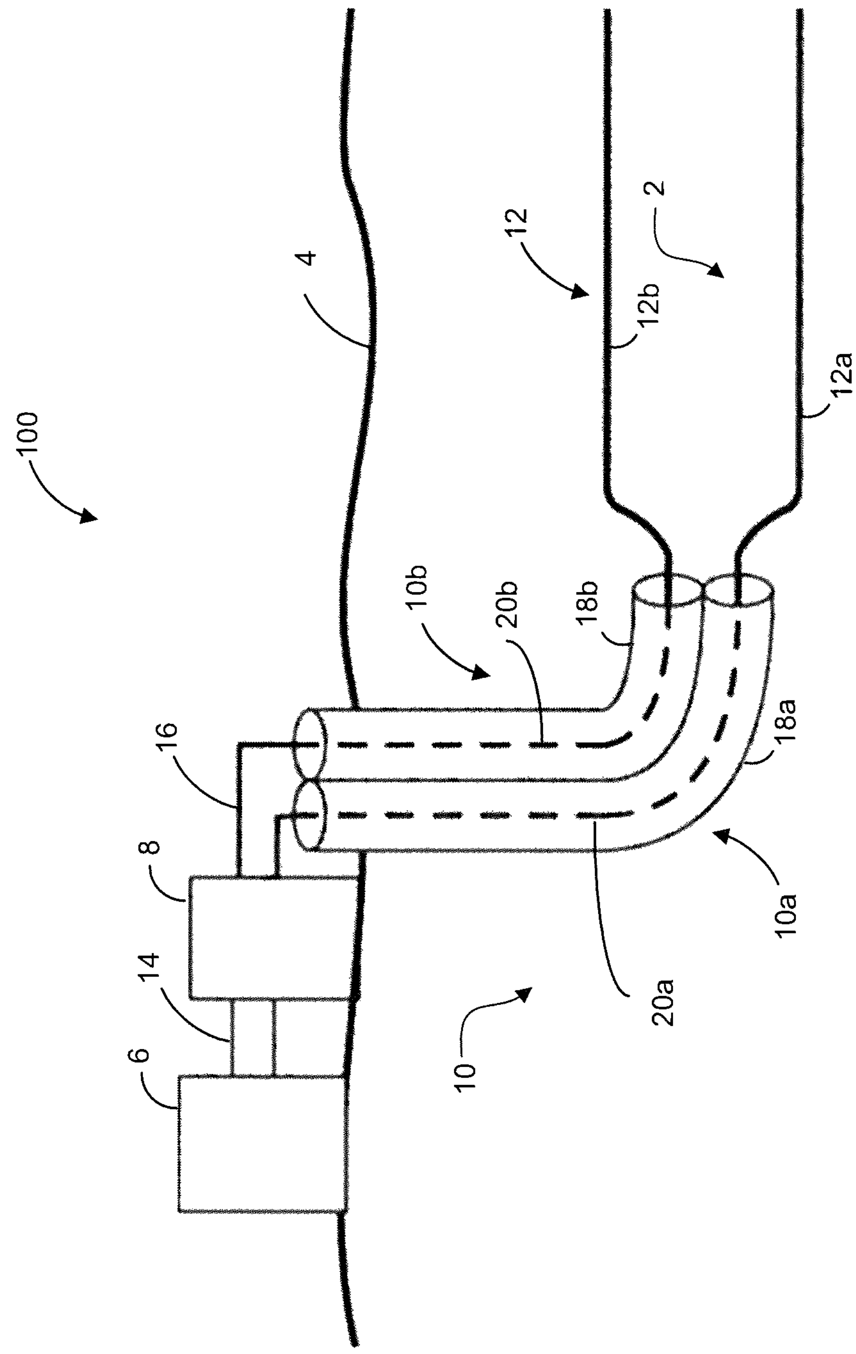
FIG. 1 is profile view of an apparatus for electromagnetic heating of formations according to at least one embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

It should be noted that phase shifts or phase differences between time-harmonic (e.g. a single frequency sinusoidal) signals can be expressed herein as a time delay. For time harmonic signals, time delay and phase difference convey the same physical effect. For example, a 180° phase difference between two time-harmonic signals of the same frequency can also be referred to as a half-period delay. As a further example, a 90° phase difference can also be referred to as a quarter-period delay. A time delay is typically a more general concept for comparing periodic signals. For instance, if periodic signals contain multiple frequencies (e.g. a series of rectangular or triangular pulses), then the time lag between two such periodic signals having the same fundamental harmonic is referred to as a time delay. For simplicity, in the case of single frequency sinusoidal signals, the term "phase shift" is generally used herein. In the case of multi-frequency periodic signals, the term "phase shift" used herein generally refers to the time delay equal to the corresponding time delay of the fundamental harmonic of the two signals.

The expression substantially identical is considered here to mean sharing the same waveform shape, frequency, amplitude, and being synchronized.

The expression phase-shifted version is considered here to mean sharing the same waveform, shape, frequency, and amplitude but not being synchronized. In some embodiments, the phase-shift may be a 180° phase shift. In some embodiments, the phase-shift may be an arbitrary phase shift so as to produce an arbitrary phase difference.

The term radio frequency when used herein is intended to extend beyond the conventional meaning of radio frequency. The term radio frequency is considered here to include frequencies at which physical dimensions of system components are comparable to the wavelength of the EM wave. System components that are less than approximately 10 wavelengths in length can be considered comparable to the wavelength. For example, a 1 kilometer (km) long underground system that uses EM energy to heat underground formations and operates at 50 kilohertz (kHz) will have physical dimensions that are comparable to the wavelength. If the underground formation is fully wet (e.g., electrical resistivity being approximately 60 and conductivity being approximately 0.002 S/m), the EM wavelength at 50 kHz is 303 meters. The length of the 1 km long radiator is approximately 3.3 wavelengths. If the underground formation is dry (e.g., electrical resistivity being approximately 6 and conductivity being approximately 3E-7 S/m), the EM wavelength at 50 kHz is 2450 meters. The length of the radiator is approximately 0.4 wavelengths. Therefore in both wet and dry scenarios, the length of the radiator is comparable to the wavelength. Accordingly, effects typically seen in conventional RF systems will be present and while 50 kHz is not typically considered RF frequency, this system is considered to be an RF system.

Referring to FIG. 1, shown therein is a profile view of an apparatus 100 for electromagnetic heating of according to at least one embodiment. The apparatus 100 can be used for electromagnetic heating of a hydrocarbon formation 2. The apparatus 100 includes an electrical power source 6, an electromagnetic (EM) wave generator 8, a waveguide portion 10, and transmission line conductor portion 12. As shown in FIG. 1, the electrical power source 6 and the electromagnetic wave generator 8 can be located at the surface 4. In at least one embodiment, any one or both of the electrical power source 6 and the electromagnetic wave generator 8 can be located below ground.

The electrical power source 6 generates electrical power. The electrical power may be one of alternating current (AC) or direct current (DC). Power cables 14 carry the electrical power from the electrical power source 6 to the EM wave generator 8.

The EM wave generator 8 generates EM power. It will be understood that EM power can be high frequency alternating current, alternating voltage, current waves, or voltage waves. The EM power can be a periodic high frequency signal having a fundamental frequency ($f_0$). The high frequency signal can have a sinusoidal waveform, square waveform, or any other appropriate shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 8 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

As noted above, in some embodiments, the EM wave generator 8 can be located underground. An apparatus with the EM wave generator 8 located above ground rather than underground can be easier to deploy. However, when the EM wave generator 8 is located underground, transmission losses are reduced because EM energy is not dissipated in the areas that do not produce hydrocarbons (i.e., distance between the EM wave generator 8 and the transmission line conductor portion 12).

The waveguide portion 10 can carry high frequency alternating current from the EM wave generator 8 to the transmission line conductors **12*a* and 12*b*. Each of the transmission line conductors 12*a* and 12*b* can be coupled to the EM wave generator 8 via individual waveguides 10*a* and 10*b*. As shown in FIG. 1, the waveguides 10*a* and 10*b* can be collectively referred to as the waveguide portion 10. Each of the waveguides 10*a* and 10*b* can have a proximal end and a distal end. The proximal ends of the waveguides can be connected to the EM wave generator 8. The distal ends of the waveguides 10*a* and 10*b* can be connected to the transmission line conductors 12*a* and 12*b***.

Each waveguide 10*a* and 10*b* can be provided by a coaxial transmission line having an outer conductor 18*a* and 18*b* and an inner conductor 20*a* and 20*b*, respectively. In some embodiments, the waveguide can be provided by a metal casing pipe as the outer conductor and the metal casings concentrically surrounding pipes, cables, wires, or conductor rods, as the inner conductors.

The transmission line conductors portion 12 can be coupled to the EM wave generator 8 via the waveguide portion 10. As shown in FIG. 1, the transmission line conductors 12*a* and 12*b* may be collectively referred to as the transmission line conductors portion 12. According to some embodiments, additional transmission line conductors 12 may be included.

Each of the transmission line conductors 12*a* and 12*b* can be defined by a pipe. In some embodiments, the apparatus may include more than two transmission line conductors. In some embodiments, only one or none of the transmission line conductors may be defined by a pipe. In some embodiments, the transmission line conductors 12*a* and 12*b* may be conductor rods, coiled tubing, or coaxial cables, or any other pipe to transmit EM energy from EM wave generator 8.

The transmission line conductors 12*a* and 12*b* have a proximal end and a distal end. The proximal end of the transmission line conductors 12*a* and 12*b* can be coupled to the EM wave generator 8, via the waveguide portion 10. The transmission line conductors 12*a* and 12*b* can be excited by the high frequency alternating current generated by the EM wave generator 8. When excited, the transmission line conductors 12*a* and 12*b* can form an open transmission line between transmission line conductors 12*a* and 12*b*. The open transmission line can carry EM energy in a cross-section of a radius comparable to a wavelength of the excitation. The open transmission line can propagate an EM wave from the proximal end of the transmission line conductors 12*a* and 12*b* to the distal end of the transmission line conductors 12*a* and 12*b*. In at least one embodiment, the EM wave may propagate as a standing wave. In at least one other embodiment, the electromagnetic wave may propagate as a partially standing wave. In yet at least one other embodiment, the electromagnetic wave may propagate as a travelling wave.

The hydrocarbon formation 2 between the transmission line conductors 12*a* and 12*b* can act as a dielectric medium for the open transmission line. The open transmission line can carry and dissipate energy within the dielectric medium, that is, the hydrocarbon formation 2. The open transmission line formed by transmission line conductors and carrying EM energy within the hydrocarbon formation 2 can be considered a "dynamic transmission line". By propagating an EM wave from the proximal end of the transmission line conductors 12*a* and 12*b* to the distal end of the transmission line conductors 12*a* and 12*b*, the dynamic transmission line can carry EM energy within long wellbores. Wellbores spanning a length of 500 meters (m) to 1500 meters (m) can be considered long.

It will be understood that while only two transmission line conductors are described here as forming a dynamic transmission line, any number of additional transmission line conductors can be added.

Figure 2:
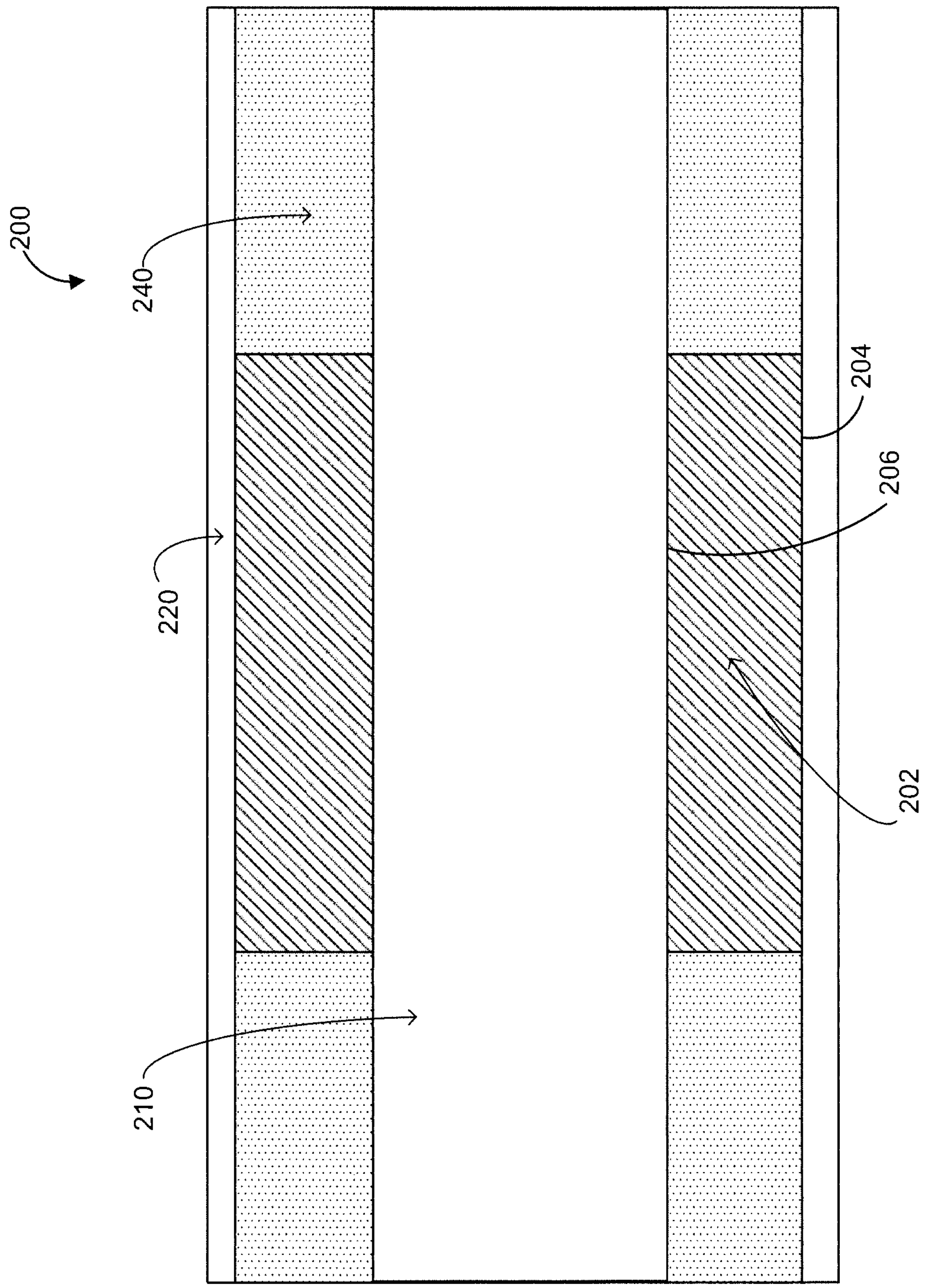
FIG. 2 is a profile view of a centralizer installed on a coaxial transmission line.

Referring to FIG. 2, shown therein is a profile view 200 of a coaxial transmission line having an inner conductor 210 surrounded by an outer conductor 220 along a longitudinal axis of the inner conductor 210, and an annular space, or annulus, 240 between the inner conductor 210 and the outer conductor 220. As shown in FIG. 2, a centralizer 202 can be installed in the annular space 240 of the coaxial transmission line.

The centralizer 202 can have an inner surface 206 that is proximal to the inner conductor 210 and an outer surface 204 that is proximal to the outer conductor 220. A cross-section of the centralizer 202 can define two circumferences, a first circumference, herein referred to as the inner circumference, corresponding to the inner surface and a second circumference, herein referred to as the outer circumference, corresponding to the outer surface.

By spanning the annular space 240 between the inner conductor 210 and the outer conductor 220, a centralizer 202 can provide concentric arrangement of the coaxial transmission line. That is, a centralizer 202 can prevent direct contact between the inner conductor 210 and the outer conductor 220. The centralizer 202 can also limit appreciable movement of the inner conductor 210 and the outer conductor 220 from designated locations.

The centralizer 202 can be formed of dielectric material to provide electrical insulation between the inner conductor 210 and the outer conductor 220. In addition, the centralizer 202 can be formed of materials having high thermal conductivity to provide a thermal bridge, or a heat spreader, to dissipate heat from the inner conductor 210 to the outer conductor 220. The inner conductor 210 can become very hot as it carries high frequency alternating current from the EM wave generator 8 to transmission line conductors 12. Centralizers 202 formed of material having high thermal conductivity can lower the temperature of the coaxial transmission line by conducting heat from the inner conductor 210 and the outer conductor 220, which in turn, can dissipate the heat. For example, a material having a thermal conductivity between about 0.1 and 2000 Watts per meter Kelvin (W/m·K) can be said to have high thermal conductivity.

Dielectric materials such as Teflon, high density polyethylene, polyether ether ketone (PEEK), or other industrial plastics can have a low dielectric constant, high dielectric strength (also referred to as breakdown voltage), and reasonable temperature handling. However, such dielectric materials can be relatively soft and will likely deform during mechanical stress associated with deployment underground. Generally, such dielectric materials cannot sustain temperatures above 250 degrees Celsius, with few exceptions such as PEEK or ester cyanate. While materials such as fiberglass or ester cyanate based composites can be mechanically stronger, they typically have poor thermal conductivity.

In contrast, ceramics can offer high thermal conductivity and good insulation. Ceramics can include potting ceramics and chemically bonded ceramics. However, ceramics can have high dielectric constant, which complicates the design, and can be brittle, which may make them harder to deploy. While some ceramics, such as alumina and zirconia-reinforced ceramics, or a combination of different ceramics can have better mechanical properties, they may not be robust enough for deployment.

The annular space 240 can also be pressurized. In addition, the annular space 240 can be filled with gas, including air nitrogen, carbon dioxide ($CO_2$), any dielectric gas that is dry with substantially no moisture content, or any combination thereof. The gas can be specifically designed to act as an arc quenching agent, for example, pressurized $CO_2$. In general, pressurized gases have better dielectric strength. Pressurized gases can also help maintain pipe integrity for well deployment. While a dielectric gas does not generally offer good thermal conductivity, in some cases, circulation can be provided to circulate the gas, thereby assisting with heat dissipation. When the dielectric gas inside the coaxial transmission line is circulated, the centralizer 202 must have an opening to permit the circulation.

Figure 3A:
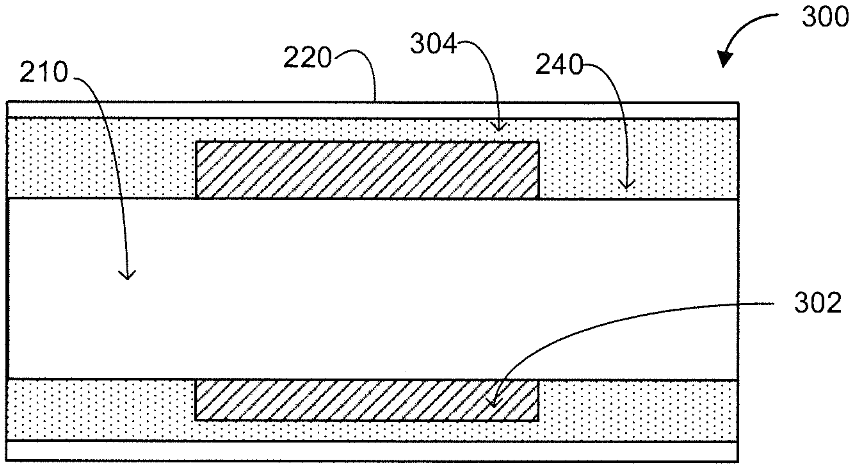
FIG. 3A is a profile view of a centralizer installed on a coaxial transmission line providing clearance between the centralizer and the outer conductor of the coaxial transmission line.

Referring to FIG. 3A, shown therein is a profile view 300 of a centralizer 302 installed on a coaxial transmission line providing clearance 304, that is an opening, between the centralizer 302 and the outer conductor 220. The coaxial transmission line is shown using the same reference numbers as that of FIG. 2. The clearance 304 can be provided by the outer circumference of the centralizer 302 being smaller than a circumference defined by an inner surface of the outer conductor 220.

Figure 3B:
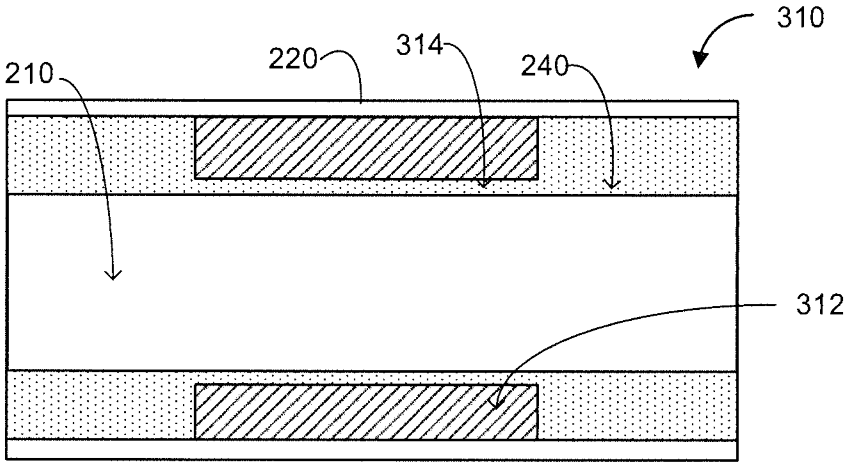
FIG. 3B is a profile view of a centralizer installed on a coaxial transmission line providing clearance between the centralizer and the inner conductor of the coaxial transmission line.

Referring to FIG. 3B, shown therein is a profile view 310 of another centralizer 312 installed on a coaxial transmission line providing clearance 314, that is an opening, between the centralizer 312 and the inner conductor 210 of the coaxial transmission line. The coaxial transmission line is shown using the same reference numbers as that of FIG. 2. Similar to centralizer 302, the clearance 314 is provided by the cross-sectional circumference of centralizer 312. However, in this case, the clearance 314 can be provided by the inner circumference of the centralizer 302 being larger than a circumference defined by an outer surface of the inner conductor 210.

Figure 3C:
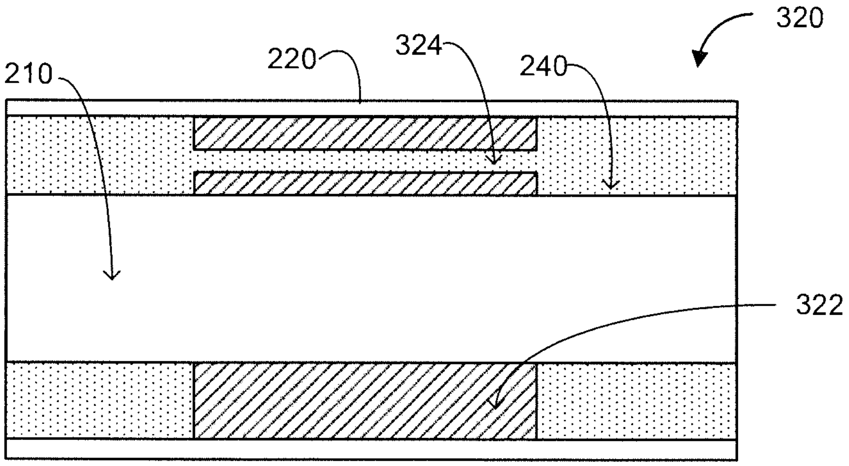
FIG. 3C is a profile view of a centralizer installed on a coaxial transmission line providing clearance within the centralizer.

Referring to FIG. 3C, shown therein is a profile view 320 of a centralizer 322 installed on a coaxial transmission line providing clearance 324 within the centralizer 322. That is, centralizer 322 has a bore hole along a longitudinal axis of the centralizer. The coaxial transmission line is shown using the same reference numbers as that of FIG. 2.

In some cases, openings 304, 314, and 324 can also form in centralizers 302, 312, and 322 due to stress during deployment or construction, the weight of the coaxial transmission line, or deformation resulting from material softening at high temperatures. Such openings 304, 314, and 324 can severely limit and effect the ability of the coaxial transmission line to handle high power or high voltage.

Figure 4A:
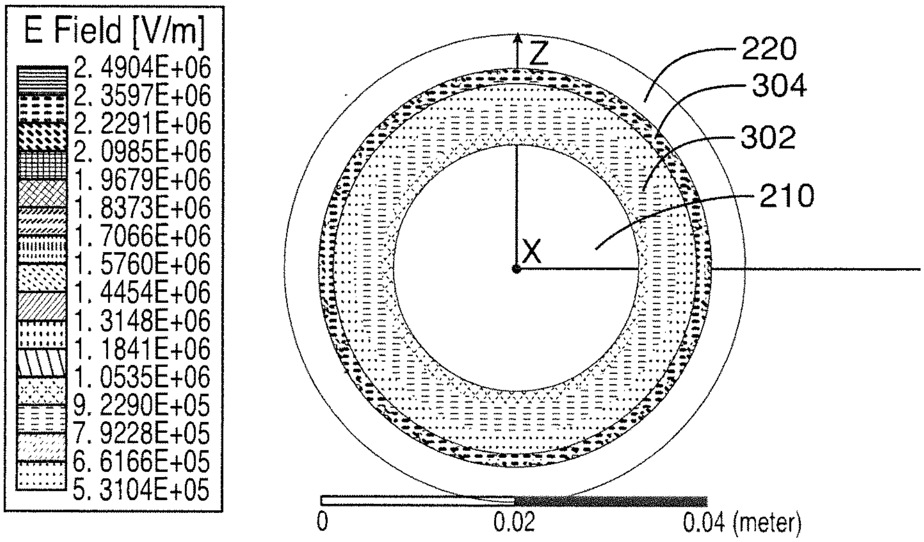
FIGS. 4A to 4C are cross-sectional, profile, and enlarged profile views of electric fields simulations of the centralizer of FIG. 3A.
Figure 4B:
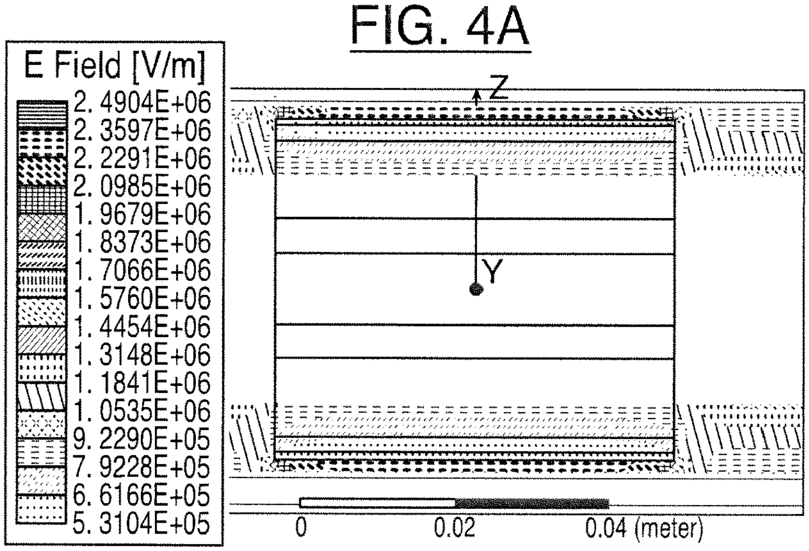
Figure 4C:
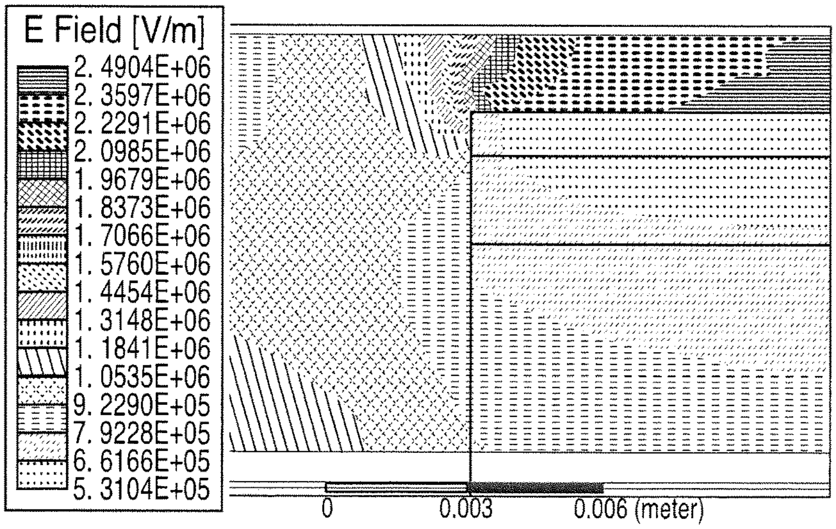

Referring now to FIGS. 4A to 4C, shown therein are cross-sectional, profile, and enlarged profile views of electric fields simulations of the centralizer 302 of FIG. 3A. As can be seen in FIG. 4A, the electric field along the length of the centralizer 302 ranges from about 1.0E6 near the inner conductor 210 to about 6.0E5 near the outer conductor 220. Beyond the centralizer 302, the electric field in the opening 304 can be in the order of about 2.4E6, which is a significant increase at the boundary of the centralizer 302 and the opening 304. That is the centralizer 302 can generate an "edge effect" of significantly increased electric fields at the boundary of the centralizer 302 and the opening 304 and/or annular space 240.

When the opening 304 is small relative to the distance between inner conductor 210 and outer conductor 220, the factor by which the electric field strength increases is approximately equal to a ratio of the dielectric constant (e.g., electrical permittivity) of the material forming the centralizer 302 to the dielectric constant of the substance filling the opening 304.

For example, if the material forming the centralizer 302 is an alumina ceramic, and the opening 304 is an air gap, the electric field strength can increase approximately 10 fold from the centralizer 302 to the opening 304. Such a high electric field increase can trigger dielectric breakdown events in the opening 304. Furthermore, dielectric breakdown events will generate plasma and can trigger an electrical arc. If centralizers 302 of FIG. 3A are used, the presence of a few small gaps 304 at locations around the perimeter of the centralizer 302 will be unavoidable and can be an arcing event risk. The voltage applied to the coaxial transmission line may be limited to reduce the risk of dielectric breakdown events. Furthermore, the power handled by the coaxial transmission line is proportional to voltage square. In this example, if the voltage is limited by a factor of 10, the power would need to be reduced by a factor of 100.

Figure 5A:
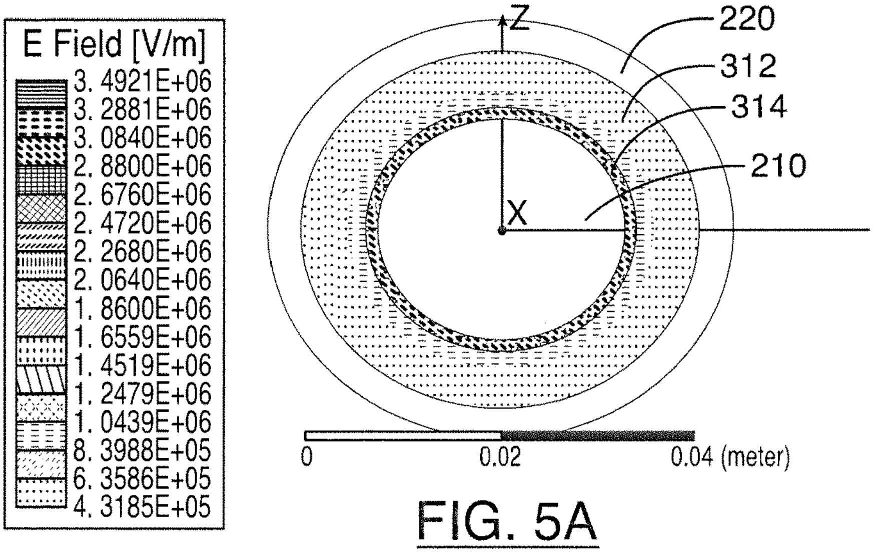
FIGS. 5A to 5C are cross-sectional, profile, and enlarged profile views of electric field simulations of the centralizer of FIG. 3B.
Figure 5B:
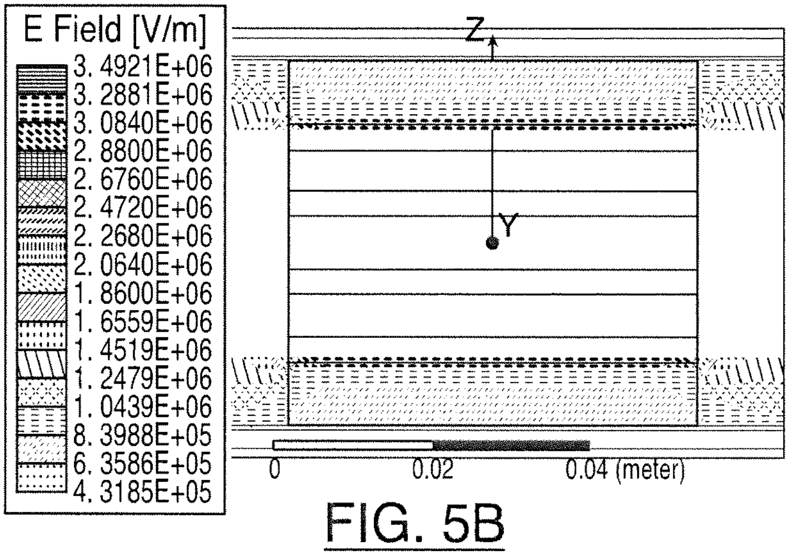
Figure 5C:
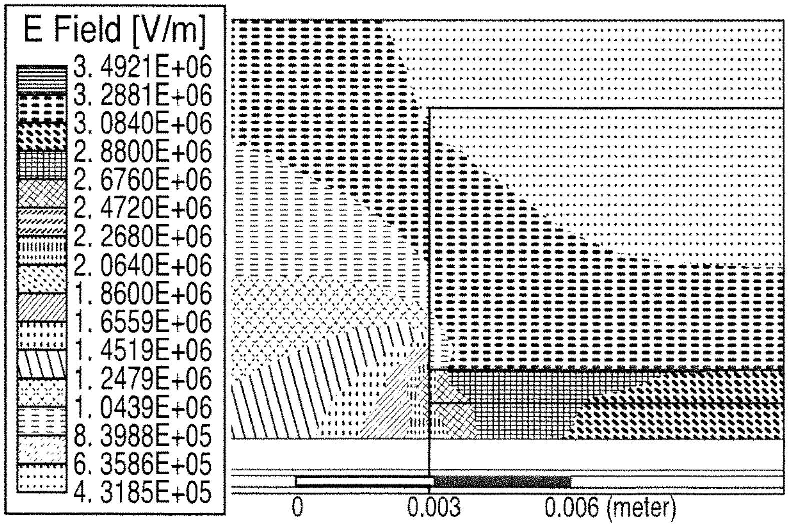

Referring to FIGS. 5A to 5C, shown therein are cross-sectional, profile, and enlarged profile views of electric field simulations of the centralizer 312 of FIG. 3B. As can be seen in FIG. 5A, the electric field along the length of the centralizer 312 ranges from about 4.3E5 near the outer conductor 220 to about 8.4E5 near the inner conductor 210. Beyond the centralizer 312, the electric field in the opening 314 can be in the order of about 2.9E6, which is a significant increase at the boundary of the centralizer 312 and the opening 314.

Figure 6A:
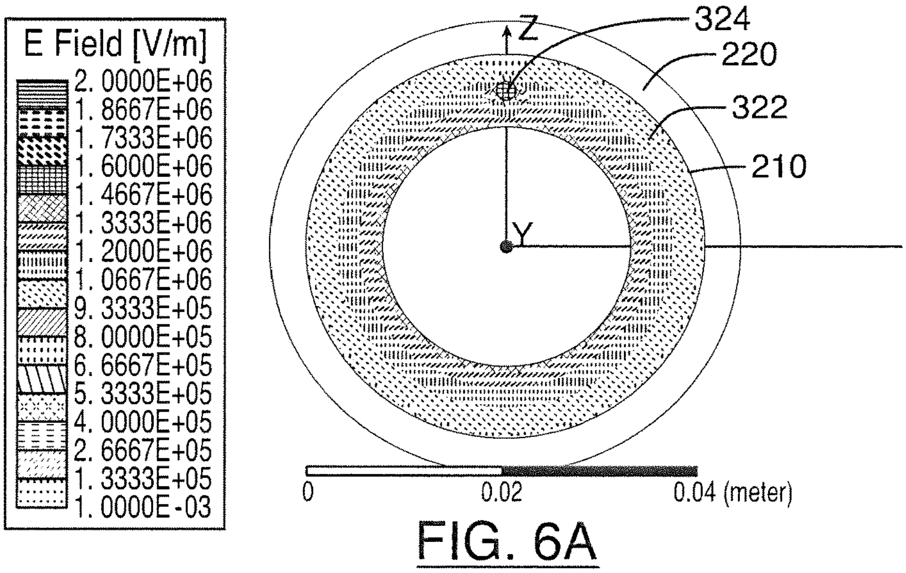
FIGS. 6A to 6C are cross-sectional, profile, and enlarged profile views of electric field simulations of the centralizer of FIG. 3C.
Figure 6B:
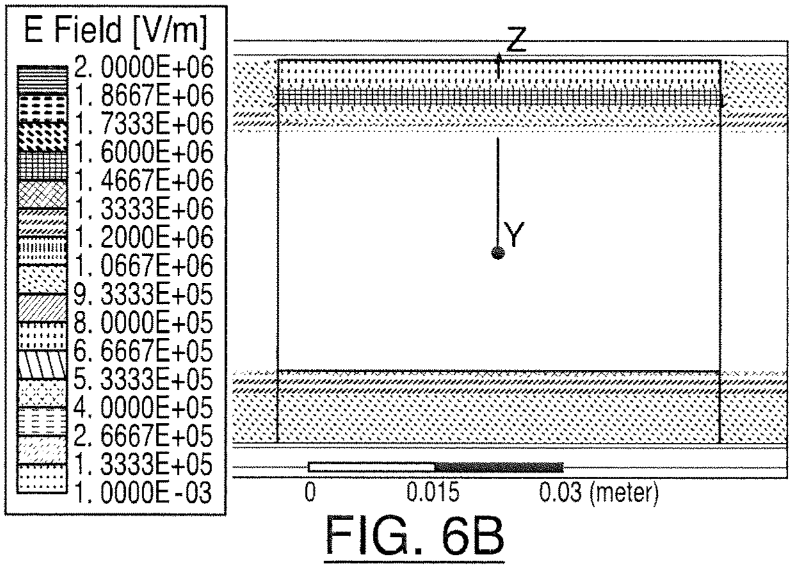
Figure 6C:
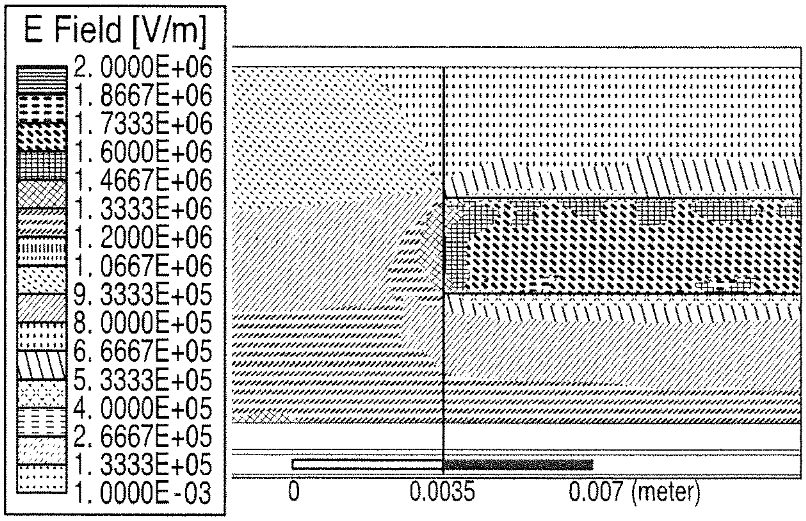

Referring to FIGS. 6A to 6C, shown therein are cross-sectional, profile, and enlarged profile views of electric field simulations of the centralizer 322 of FIG. 3C. As can be seen in FIG. 6A, the electric field along the length of the centralizer 322 ranges from about 1.2E6 near the inner conductor 210 to about 5.3E5 near the outer conductor 220. Beyond the centralizer 322, the electric field in the opening 324 can be in the order of about 1.6E6, which is a significant increase at the boundary of the centralizer 322 and the opening 324.

Similar electric field increases at the boundary of centralizers and any other openings 304, 314, and 324 that may be used for fluid transport through the centralizers, as illustrated in FIGS. 3A to 3C. A variety of shapes for openings can be used, including radial openings extending from the inner conductor 210 to the outer conductor 220. Generally, any opening 304, 314, and 324 can result in local field enhancement proportional to the ratio of the dielectric constants of the centralizer 302, 312, and 322 and the opening 304, 314, and 324. Openings are typically filled with fluid.

The centralizer 302, 312, and 322 can have very limited, if any at all, area of contact with the outer conductor 220. Hence, the centralizer 302, 312, and 322 has limited ability to transport heat from the inner conductor 210 to outer conductor 220 of the coaxial transmission line. Typically the inner conductor 210 can have larger electrical loss and heat up significantly more than the outer conductor 220. It is important to provide means to transport the heat away from the inner conductor 210.

Centralizers can create a disturbance for an EM wave travelling along the coaxial transmission line. As shown in FIGS. 4A to 6C, centralizers lead to a local increase of the electric field. In addition, centralizers can cause a reflection of the EM wave. The overall reflection can be problematic when the size of the centralizer is large with respect to the wavelength of the EM wave. That is, a significant impedance reflector can be generated when the size of the centralizer is large with respect to the wavelength of the EM wave. While a ratio of the size of the centralizer to the wavelength of the EM wave can be arbitrary and/or application dependent, a threshold of approximately $\lambda/16$ is considered to cause a significant impedance reflector.

For example, for an EM wave having a frequency of 1 Gigahertz (GHz) in an air-filled line, a centralizer that is larger than 19 millimeters (mm) creates a significant impedance reflector. As well, for an EM wave having a frequency of 1 Megahertz (MHz) or higher in an air-filled line, a centralizer that is larger than 18 millimeters (mm), it can scatter and reflect a significant portion of the EM wave.

Below 1 MHz, centralizers do not generally create a significant impedance reflector as long as the length of the centralizer is smaller than 1 meter (m), except for centralizers formed with a material having a very high dielectric constant. However, the centralizer may still contribute to an effective capacitance of the transmission line and hence affect the line and transform the load impedance.

While it is generally desirable to minimize the overall reflection from the combined effects of all centralizers along the coaxial transmission line, at high power and low frequency, the local increase of the electric field can be a more significant issue to address because it may trigger a dielectric breakdown and lead to an arcing event.

Figure 7B:
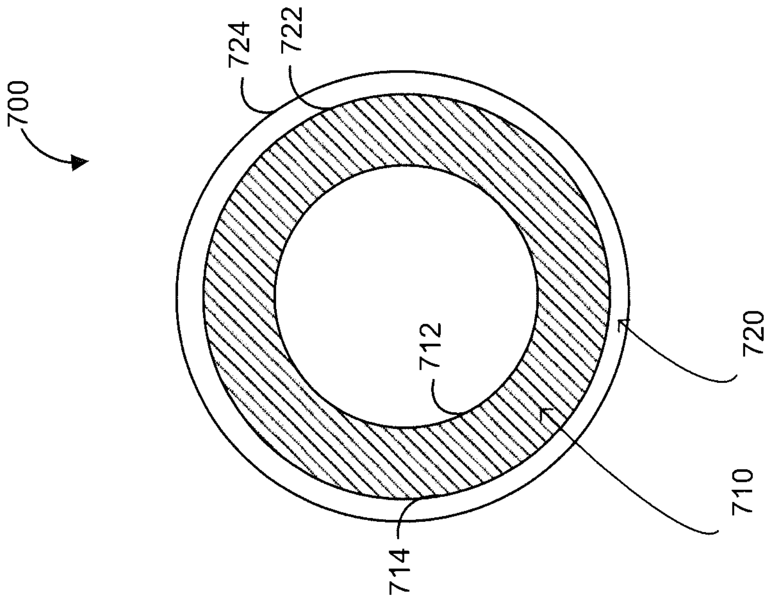
FIGS. 7A and 7B are profile and cross-sectional views of an apparatus for a coaxial transmission line, according to at least one embodiment.
Figure 7A:
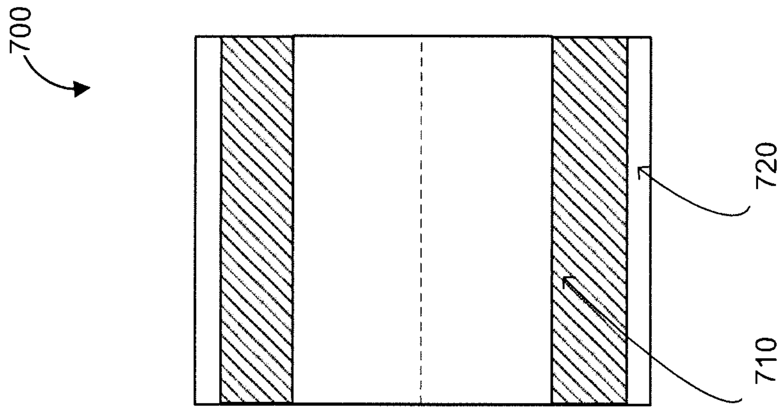

Referring to FIGS. 7A and 7B, shown therein are profile and cross-sectional views of an apparatus 700 for a coaxial transmission line, according to at least one embodiment. The apparatus 700 can include a dielectric member 710 and a first conductive member 720.

The dielectric member 710 can have an inner surface 712 defining a bore along a longitudinal axis, indicated in FIG. 7 by the dashed line. The dielectric member 710 has an outer surface 714. The dielectric member 710 can be formed of any insulating material, including but not limited to, industrial plastics, glasses, composites, and ceramics, or any combination thereof. In at least one embodiment, the dielectric member 710 can be a unitary body. In at least one other embodiment, the dielectric member 710 can be formed of a composite structure including a plurality of different materials. In at least one other embodiment, the dielectric member 710 can be formed of a plurality of layers.

In at least one embodiment, the dielectric member 710 can be formed of a material having a high thermal conductivity in order to provide a thermal bridge, or a heat spreader, to dissipate heat from the inner conductor 210 to the outer conductor 220. High thermal conductivity is advantageous because it allows for conduction of heat from the inner conductor 210 to the outer conductor 220, which improves power handling. In at least one embodiment, the material of the dielectric member 710 can have a thermal conductivity between about 0.1 and about 2000 Watts per meter-Kelvin (W/m·K). For example, in at least one embodiment, the dielectric member 710 can be formed of boron nitride, which has a thermal conductivity of about 30 W/m·K. In at least one other embodiment, the dielectric member 710 can be formed of glass (i.e., Pyrex), which has a thermal conductivity of about 1 W/m·K.

In at least one embodiment, the dielectric member 710 can be formed of a material having a dielectric constant between about 1 and about 10. In some embodiments, the dielectric member 710 can be formed of a material having a higher dielectric constant because it offers at least one of a preferred thermal property, a preferred mechanical property, and a preferred electrical property. In at least one embodiment, the material of the dielectric member 710 can have a low dielectric constant that is between about 1 and about 6. A low dielectric constant is advantageous because it can minimize the electromagnetic field discontinuity effects.

In at least one embodiment, the dielectric member 710 can be formed of a material having a dielectric strength of at least 9 megavolts per meter (MV/m). Preferably, the material can have a dielectric strength of at least 10 MV/m. In at least one embodiment, the dielectric member 710 can be formed of glass, which has a dielectric strength of about 9 MV/m. High dielectric strength is advantageous because it can improve power handling.

The first conductive member 720 can be mounted axially around the dielectric member 710. The first conductive member 720 can have an inner surface 722 that is proximal to the dielectric member 710. The first conductive member 720 also has an outer surface 724. The first conductive member 720 can extend along the longitudinal axis and have a first end and a second end.

The first conductive member 720 can be formed of any conductive metal, including but not limited to, steel, high strength conductors such phosphor-bronze, beryllium copper, or any combination thereof. It will should be noted that such conductive metals can provide good thermal conductivity.

In at least one embodiment, the first conductive member 720 can be formed of a material having a conductivity of at least 1E6 Siemens per meter (S/m). For example, the first conductive member 720 can be formed from steel, which has a conductivity of around 1E6 S/m. Preferably, the first conductive member can be formed of a material having a conductivity of at least 1E7. For example, the first conductive member 720 can be formed of aluminum, which has a conductivity of 2.65E7 S/m. In another example, the first conductive member 720 can be formed of copper, which has a conductivity of 5.96E7 S/m.

In at least one embodiment, the first conductive member 720 can be formed of a material that is non-magnetic. That is, the first conductive member 720 can be formed of a material that has a relative magnetic permeability that is approximately 1. For example, the first conductive member 720 can be formed of aluminum or copper.

In at least one embodiment, the first conductive member 720 may be formed of a material that is magnetic, such as carbon steel. When the first conductive member 720 is formed of a magnetic material, it is preferably cladded or plated with a non-magnetic material, such as aluminum or copper.

In at least one embodiment, the first conductive member 720 can be formed of a material having substantially greater hardness than the outer conductor 220 of the coaxial transmission line. When the first conductive member 720 is substantially harder than the outer conductor 220, galling can be avoided. That is, a harder first conductive member 720 can allow the first conductive member 720 to withstand wear caused by friction when it is in physical contact with the outer conductor 220.

Furthermore, to prevent damage to the outer conductor 220 when the first conductive member 720 is in physical contact with the outer conductor 220, the first conductive member 720 can have rounded edges. Sharp edges on the first conductive member 720 may cut into, or shave, the inner surface of the outer conductor 220 during installation of the apparatus 700. Furthermore, damage to the outer conductor 220 can be a greater risk when the first conductive member 720 is formed of material having substantially greater hardness than the outer conductor 220.

In at least one embodiment, the first conductive member 720 can be a unitary body. In at least one other embodiment, the first conductive member 720 can be formed of a composite structure including a plurality of different conductive metals. In at least one embodiment, the first conductive member can be formed of a plurality of layers.

In at least one embodiment, the first conductive member 720 can be hard surfaced to withstand wear caused by friction when it is in physical contact with the outer conductor 220. Hard surfacing can be provided by heat treating the first conductive member 720, or providing a coating on the first conductive member 720.

In at least one embodiment, the outer surface 724 of the first conductive member 720 can be coated with a material having a low friction coefficient and good electrical conductivity. A low friction coefficient can minimize friction between the outer surface 720 of the first conductive member 720 as the inner conductor 210 is deployed with the apparatus 700 mounted thereon. The low friction coating can include graphene, an electroless nickel, or a combination thereof, such as an alloy containing electroless nickel. For example, an electroless nickel boron nitride such as Nibore™ can be used as a coating that provides a low friction coefficient, good electrical conductivity. In at least one embodiment, the coating having a low friction coefficient and good electrical conductivity also provides a hard surface to withstand wear.

In at least one embodiment, the first conductive member 720 can include cladding on the inner surface 722, the outer surface 724, or both the inner surface 722 and the outer surface 724 of the first conductive member 720. The term "cladding", as used herein, broadly refers to one or more layers of highly conductive material provided by cladding, electroplating, or any other appropriate means. Furthermore, cladding can be provided on a portion of or the entire surface. Cladding can be highly conductive metal with low magnetic permeability. Any appropriate material may be used to provide cladding. For example, cladding can be copper or aluminum.

In at least one embodiment, the first conductive member 720 can be mounted axially around the dielectric member 710 using an adhesive or filler. That is, in some embodiments, adhesive can be used between the outer surface 714 of the dielectric member 710 and the inner surface 722 of the first conductive member 720. The adhesive or filler can provide tight contact between the dielectric member 710 and the first conductive member 720. In at least one embodiment, the adhesive or filler can have a low dielectric loss. In at least one embodiment, the adhesive or filler can be rated for high temperatures. In at least one embodiment, the adhesive can be a ceramic glue.

In at least one other embodiment, the first conductive member 720 can be mounted axially around the dielectric member 710 with an interference fit (i.e., press fit). An interference fit can be accomplished by pressing the first conductive member 720 onto the dielectric member 710 such that it wraps around the dielectric member 710. Furthermore, an interference fit can also be accomplished by heating the first conductive member 720 when it is wrapped around the dielectric member 710 and subsequently cooling the first conductive member 720 in order to shrink the first conductive member 720 onto the dielectric member 710.

With an interference fit, the dielectric member 710 is in a state of compression. Mechanical properties of a compressed dielectric member 710 can be much greater than that when the dielectric member 710 is in a state of tension. Thus, an apparatus 700 with an interference fit can be more robust and able to withstand forces experienced during deployment or removal in the coaxial transmission line. An interference fit allows the dielectric member 710 to be formed of a brittle material, that is, a material having lower tensile strength than the dielectric member 710 to which a first conductive member 720 is mounted to with an adhesive or filler.

In at least one embodiment, the first conductive member 720 can provide at least part of a mould, within which the dielectric member 710 can formed when the dielectric member 710 is formed of a potting ceramic. That is, mounting of the first conductive member 720 around the dielectric member 710 can be provided by moulding the dielectric member 710 into the first conductive member 720 and allowing the dielectric member 710 to cure or set.

In at least one embodiment, the dielectric member 710 can be ring shaped. That is, the cross-section of the inner surface 712 of the dielectric member 710 can have a perimeter that is circular. As shown in FIG. 7B, in some embodiments, the cross-section of the inner surface 712 and the outer surface 714 of the dielectric member 710 can both can have perimeters that are circular. In at least one embodiment, the cross-section of the inner surface 712 can have a perimeter that is circular while the cross-section of the outer surface 714 can have a perimeter defining a different shape such as an oval, square, rectangle.

Similarly, as shown in FIG. 7B, in some embodiments, the cross-section of the inner surface 722 and the outer surface 724 of the first conductive member 720 can both have a perimeter that is circular. In at least one embodiment, the first conductive member 720 can be ring shaped. That is, the cross-section of the inner surface 722 can have a perimeter that is circular. In at least one embodiment, the cross-section of the outer surface 724 can have a perimeter defining a different shape from the cross-section of the outer surface 722.

In at least one embodiment, the dielectric member 710 is a dielectric ring and the first conductive member 720 is a tightly fitted metal ring. In at least one embodiment, the dielectric member 710 is a ceramic ring and the first conductive member 720 is a tightly fitted metal ring.

Figure 8B:
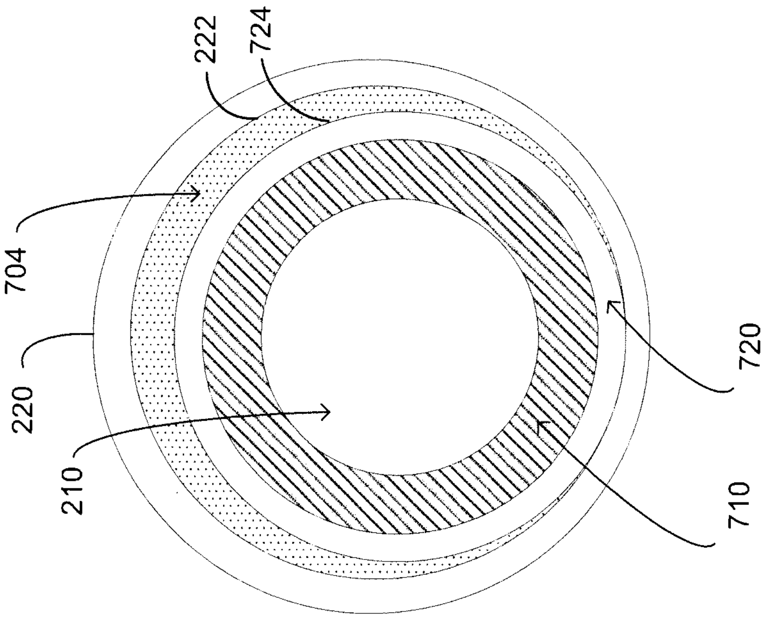
FIGS. 8A and 8B are profile and cross-sectional views of the apparatus of FIG. 7A installed on a coaxial transmission line.
Figure 8A:
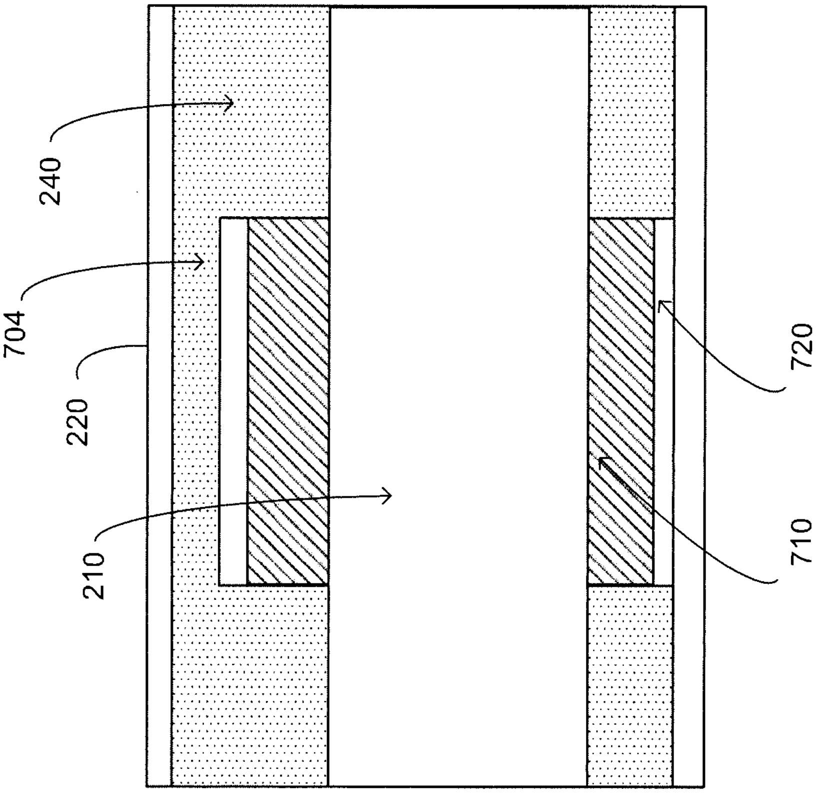

Referring to FIGS. 8A and 8B, shown therein are profile and cross-sectional views of the apparatus 700 of FIG. 7A installed on a coaxial transmission line, according to at least one embodiment. The coaxial transmission line is shown using the same reference numbers as that of FIG. 2.

The apparatus 700 can be positioned in the annular space 240 defined by the inner conductor 210 and the outer conductor 220 of the coaxial transmission line. In some embodiments, the apparatus 700 can be mounted axially around the inner conductor 210. In at least one embodiment, the apparatus 700 can be mounted to the inner conductor 210 using an adhesive. That is, in some embodiments, adhesive can be used between the inner surface 712 of the dielectric member 710 and an outer surface of the inner conductor 210. Any appropriate adhesive can be used. In at least one embodiment, the adhesive can be a high temperature glue or epoxy.

In at least one embodiment, the dielectric member 710 can include cladding on the inner surface 712, the outer surface 714, or both the inner surface 712 and the outer surface 714 of the dielectric member 710. The term "cladding", as used herein, broadly refers to one or more layers of highly conductive material provided by cladding, electroplating, or any other appropriate means. Furthermore, cladding can be provided on a portion of or the entire surface. Cladding can be highly conductive metal with low magnetic permeability. Any appropriate material may be used to provide cladding. For example, cladding can be copper or aluminum. Cladding can be provided on the dielectric member 710 when the mechanical strength is less of a concern.

In at least one embodiment, the dielectric member 710 can be mounted axially around the inner conductor 210 by a mechanical interlock. In at least one embodiment, the mechanical interlock can be threading on a metallized dielectric member 710 that is complementary to threading on an outer surface of the inner conductor 210. With threading, the inner surface 712 of the dielectric member 710 can engage with the outer surface of the inner conductor 210. In at least one embodiment, the inner conductor can be a pipe and the threading on an outer surface of the inner conductor 210 can relate to a pup joint on the pipe.

In some embodiments, the dielectric member 710 can also be formed of more than one portion. The dielectric member 710 can be split axially into the more than one portion and lock into circumferential grooves in the inner conductor 210 rather than threading. The circumferential grooves can be rounded to eliminate sharp edges that can cause electric field concentration.

As shown in FIG. 8B, a cross-section of the outer surface 724 of the first conductive member 720 can be orthogonal to the longitudinal axis and define a first perimeter. A cross-section of an inner surface of the outer conductor 220 of the coaxial transmission line can be orthogonal to the longitudinal axis and define a second perimeter.

The first perimeter can be smaller than the second perimeter and thereby provide clearance 704 along the longitudinal axis between a portion of the outer surface 724 of the first conductive member 720 and the inner surface of the outer conductor 220 of the coaxial transmission line when the apparatus 700 is positioned in an annulus defined by the inner conductor 210 and the outer conductor 220 of the coaxial transmission line.

Apparatus 700 can provide clearance 704, that is, an opening, between the apparatus 700 and the outer conductor 220 of the coaxial transmission line. The clearance 704 can be provided by the outer surface 724 being smaller than a circumference defined by an inner surface of the outer conductor 220. The opening 704 allows for movement of fluids from a first end of the apparatus 700, along the longitudinal axis, to a second end of the apparatus 700. That is, the opening 704 allows fluid to move within the coaxial transmission line.

As shown in FIG. 8B, the apparatus 700 can be in physical contact with the outer conductor 220. In particular, the first conductive member 720 can be in physical contact with the outer conductor 220. That is, the apparatus 700 results in the coaxial transmission line having an asymmetrical cross-section. Physical contact can occur simply through gravity when the coaxial transmission line is substantially horizontal. Physical contact can also be provided by bucking of substantially vertical coaxial transmission lines, or by contact members mounted laterally on the outer surface 724 of the first conductive member 720 to maintain contact between the first conductive member 720 and the outer conductor 220. In at least one embodiment, the contact members can be spring members and/or brushes.

The physical contact between the first conductive member 720 and the outer conductor 220 allows for heat conduction from the first conductive member 720 to the outer conductor 220. Since the first conductive member 720 can typically have much higher thermal conductivity than that of the dielectric member 710, even if the area of physical contact between the first conductive member 720 and the outer conductor 220 is limited, the heat conduction can be an improvement compared to the heat dissipation of the centralizer 202 shown in FIG. 2.

The physical contact between the first conductive member 720 and the outer conductor 220 also provides an electrical contact. Electrical contact between the first conductive member 720 and the outer conductor 220 can allow the potential between the first conductive member 720 and the outer conductor 220 to equalize. Current passing between the apparatus 700 and the outer conductor 220 is expected to be relatively small. When the first conductive member 720 and the outer conductor 220 have substantially the same potential, no substantial electric field is generated within the opening 704.

Figure 9A:
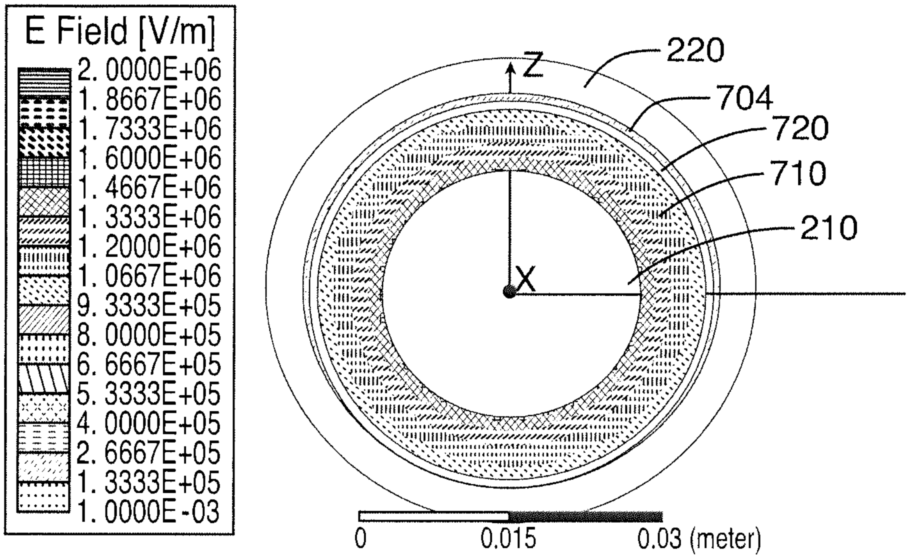
FIGS. 9A, 9B, 9C, and 9D are cross-sectional, profile, enlarged profile, and further enlarged profile views of electric field simulations of the apparatus of FIG. 8A.
Figure 9B:
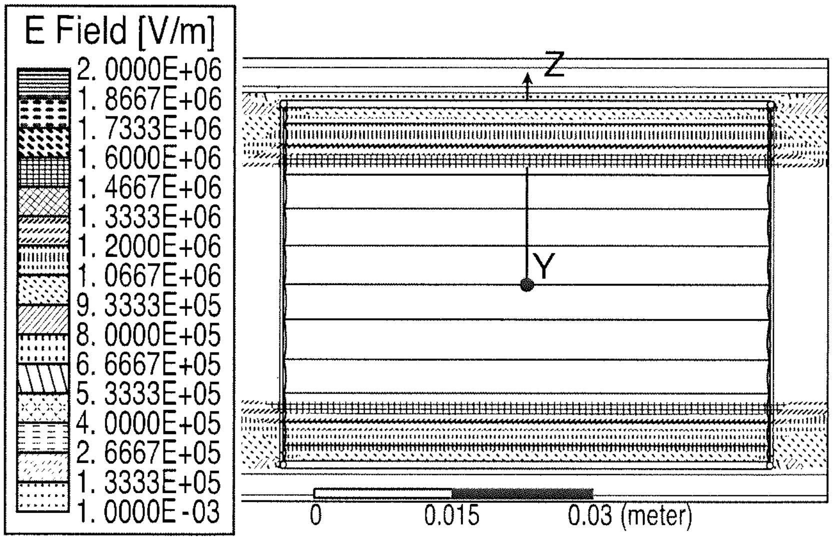
Figure 9C:
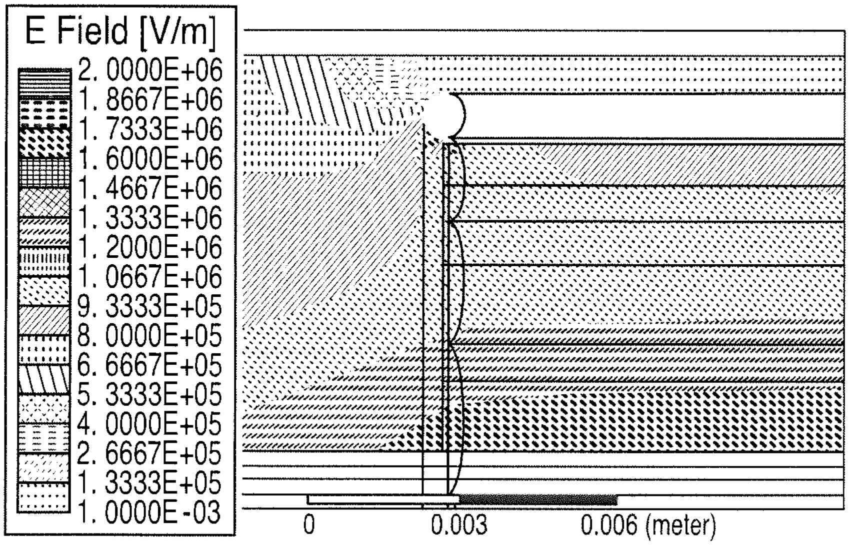

Referring now to FIGS. 9A, 9B, 9C, and 9D, shown therein are cross-sectional, profile, and enlarged profile views of electric field simulations of the apparatus 700 of FIG. 8A. As can be seen in FIG. 9A, the electric field along the length of the apparatus 700 ranges from about 1.5E6 near the inner conductor 210 to about 8.0E5 near the outer conductor 220. As can be seen in FIGS. 9A, 9B and 9C, no substantial electric field is generated within the opening 704. That is, the enhanced electric fields in the openings 304, 314, and 324 shown in FIGS. 4A to 4C can be avoided.

Figure 9D:
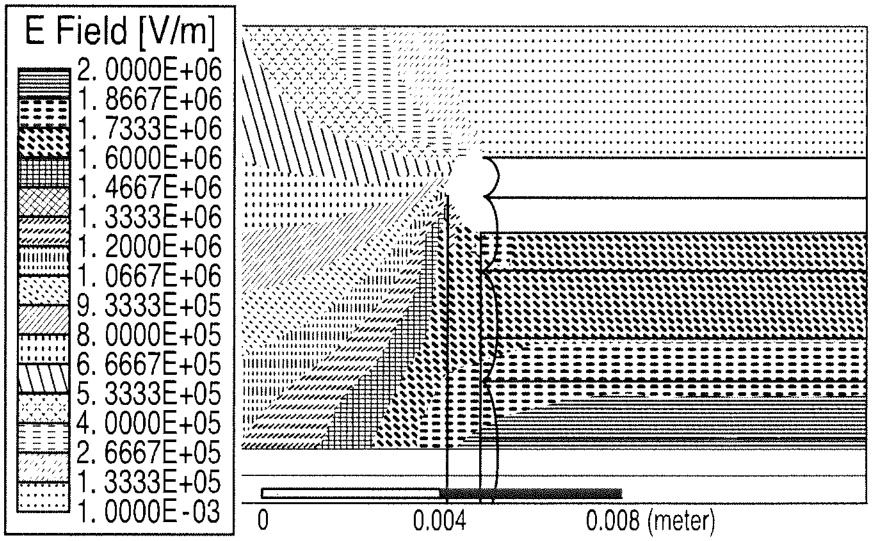

However, as can be seen in FIG. 9D, the apparatus 700 can still generate stronger electric fields near the edge of the apparatus 700, particularly near the inner conductor 210. The stronger electric fields can be caused by the reduced circumference of the coaxial transmission line at the apparatus 700, namely, the first perimeter defined by the cross-section of the outer surface 724 of the first conductive member 720 being smaller than the second perimeter defined by the cross-section of the inner surface of the outer conductor 220.

Generation of stronger electric fields can depend on the size of the opening 704, that is, the size of the difference between the first perimeter and the second perimeter, and the thickness of the first conductive member 720, that is, the difference between the outer surface 724 and the inner surface 722 of the first conductive member 720. The stronger electric field can reduce the maximum voltage that can be applied to the coaxial transmission line. In order to maintain low field enhancement near the edge of the apparatus 700, the opening 704 and the thickness of the first conductive member 720 between the inner surface 722 and the outer surface 724 can be minimized.

With the apparatus 700 installed on the coaxial transmission line, the dielectric member 710 can provide electrical isolation between the inner conductor 210 and the outer conductor 220 while the first conductive member 720 can provide heat conduction from the inner conductor 210 to the outer conductor 220.

Figure 10B:
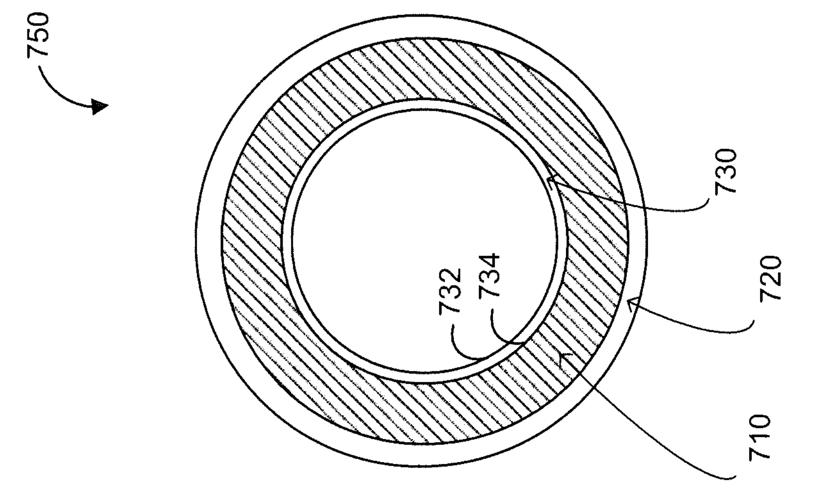
FIGS. 10A and 10B are profile and cross-sectional views of an apparatus for a coaxial transmission line, according to at least one other embodiment.
Figure 10A:
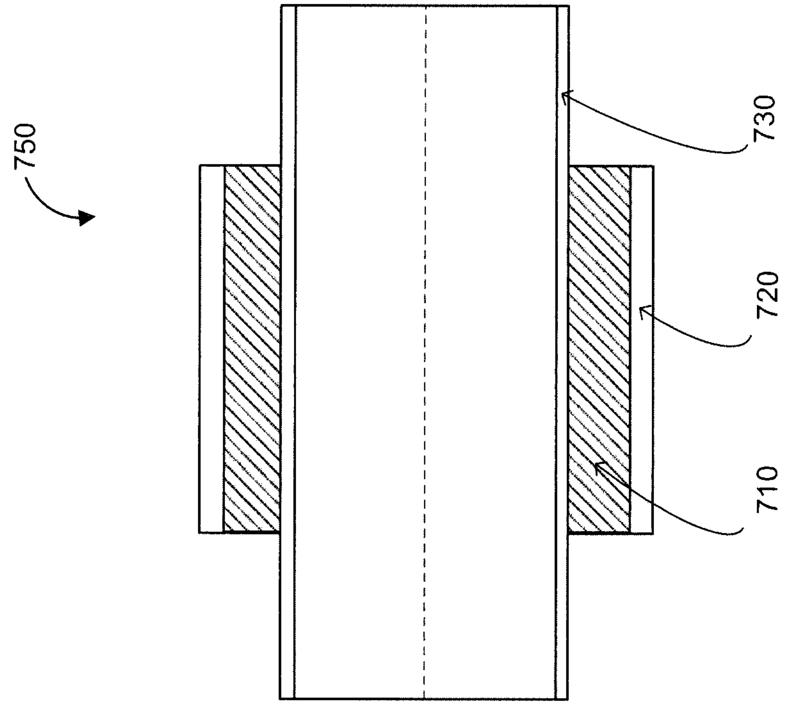

Referring now to FIGS. 10A and 10B, shown therein are profile and cross-sectional views of an apparatus 750 for a coaxial transmission line, according to at least one other embodiment. Features common to apparatus 700 and 750 are shown using the same reference numbers. The apparatus 750 can include a dielectric member 710, a first conductive member 720, and a second conductive member 730.

As shown in FIGS. 10A and 10B, the second conductive member 730 can line the inner surface 712 of the dielectric member 710. The second conductive member 730 has an inner surface 732. The second conductive member 730 can have an outer surface 734 that is proximal to the dielectric member 710. The second conductive member 730 can extend along the longitudinal axis and have a first end and a second end. The second conductive member 730 can be provided to increase the mechanical strength of the apparatus 750.

The second conductive member 730 can be formed of any conductive metal, including but not limited to, steel, high strength conductors such phosphor-bronze, beryllium copper, or any combination thereof. Such conductive metals can provide advantageous thermal conductivity.

In at least one embodiment, the second conductive member 730 can be formed of a material having a conductivity of at least 1E6 Siemens per meter (S/m). For example, the second conductive member 730 can be formed of steel, which has a conductivity of approximately 1E6 S/m. In at least one embodiment, the second conductive member 730 can be formed of material having a conductivity of at least 1E7 S/m. In another example, the second conductive member 730 can be formed of aluminum, which has a conductivity of approximately 2.65E7 S/m. In at least one other embodiment, the second conductive member 730 can be formed of copper, which has a conductivity of approximately 5.96E7 S/m.

In at least one embodiment, the second conductive member 730 can be formed of a material that is non-magnetic. That is, the second conductive member 730 can be formed of a material that has a relative magnetic permeability that is approximately 1.

In at least one embodiment, the second conductive member 730 can be formed of a material having substantially greater hardness than the inner conductor 210 of the coaxial transmission line. When the second conductive member 730 is substantially harder than the inner conductor 210, galling can be avoided. That is, a harder second conductive member 730 can allow the second conductive member 730 to withstand wear caused by friction when it is in physical contact with the inner conductor 210.

In at least one embodiment, the second conductive member 730 can be a unitary body. In at least one other embodiment, the second conductive member 730 can be formed of a composite structure including a plurality of different conductive metals. In at least one embodiment, the first conductive member can be formed of a plurality of layers.

In at least one embodiment, the second conductive member 730 can include cladding on the inner surface 732, the outer surface 734, or both the inner surface 732 and the outer surface 734 of the second conductive member 730. Again, the term "cladding", as used herein, broadly refers to one or more layers of highly conductive material provided by cladding, electroplating, or any other appropriate means. Furthermore, cladding can be provided on a portion of or the entire surface. Cladding can be highly conductive metal with low magnetic permeability. Any appropriate material may be used to provide cladding. For example, cladding can be copper or aluminum.

In at least one embodiment, the second conductive member 730 can be a tube. In at least one embodiment, the second conductive member 730 can be tightly fitted.

In at least one embodiment, the second conductive member 730 can be mounted axially within the dielectric member 710 using an adhesive or filler. That is, in some embodiments, adhesive can be used between the inner surface 712 of the dielectric member 710 and an outer surface 734 of the second conductive member 720. The adhesive or filler can provide tight contact between the dielectric member 710 and the second conductive member 730. In at least one embodiment, the adhesive or filler can have a low dielectric loss. In at least one embodiment, the adhesive or filler can be rated for high temperatures. In at least one embodiment, the adhesive can be a ceramic glue.

In at least one embodiment, the first conductive member 720 can be mounted axially around the dielectric member 710 using an adhesive or filler. That is, in some embodiments, adhesive can be used between the outer surface 714 of the dielectric member 710 and the inner surface 722 of the first conductive member 720. The adhesive or filler can provide tight contact between the dielectric member 710 and the first conductive member 720. In at least one embodiment, the adhesive or filler can have a low dielectric loss. In at least one embodiment, the adhesive or filler can be rated for high temperatures. In at least one embodiment, the adhesive can be a ceramic glue.

Figure 11B:
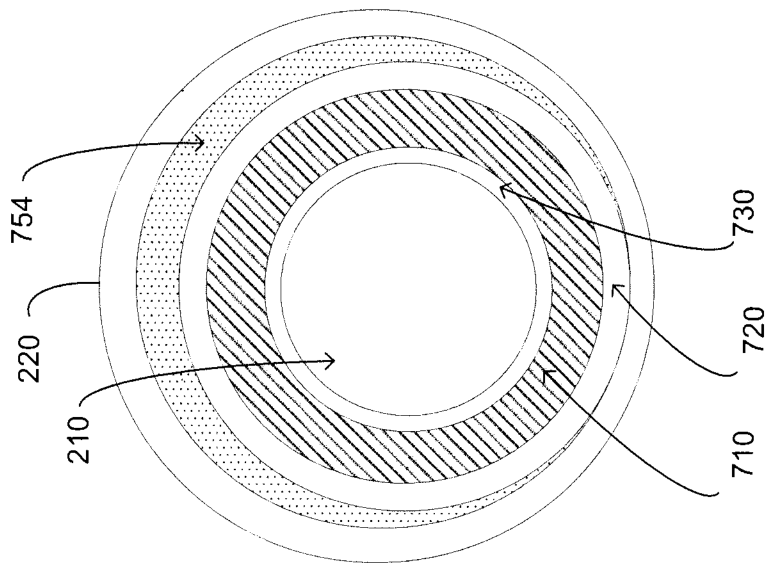
FIGS. 11A and 11B are profile and cross-sectional views of the apparatus of FIG. 10A installed on a coaxial transmission line.
Figure 11A:
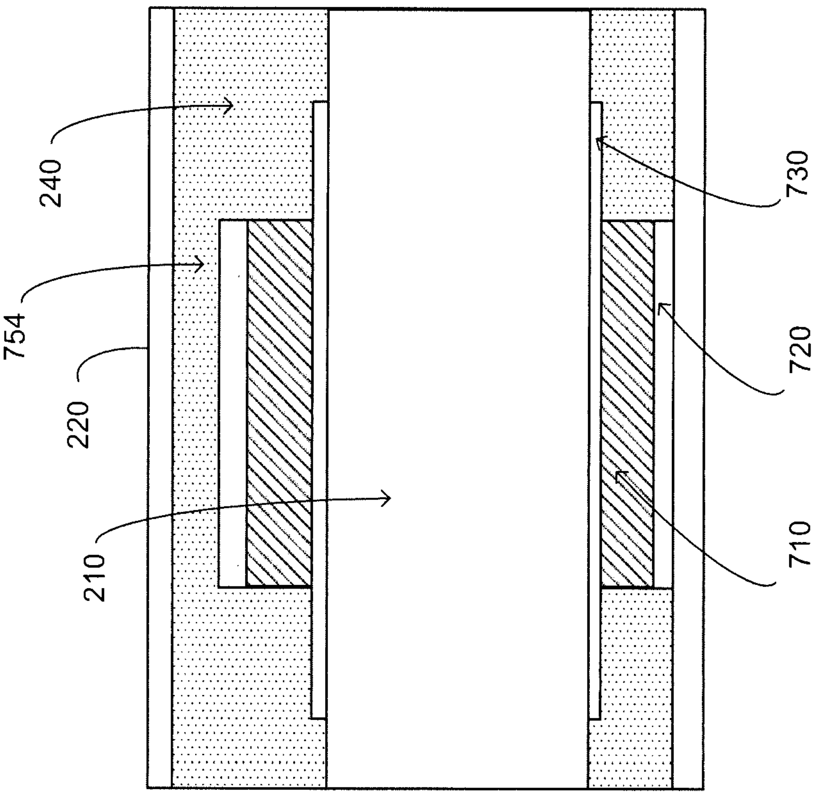

Referring now to FIGS. 11A and 11B, shown therein are profile and cross-sectional views of the apparatus 750 of FIG. 10A installed on a coaxial transmission line, according to at least one embodiment. The coaxial transmission line is shown using the same reference numbers as that of FIG. 2. The apparatus 750 can be positioned in the annular space 240 defined by the inner conductor 210 and the outer conductor 220 of the coaxial transmission line.

As shown in FIGS. 11A and 11B, the apparatus 750 can provide clearance 754 between the apparatus 750 and the outer conductor 220 of the coaxial transmission line, similar to apparatus 700. That is, at a cross-section orthogonal to the longitudinal axis of the coaxial transmission line, clearance 754 can be provided by the cross-section of the outer surface 724 of the first conductive member 720 being smaller than the cross-section of the inner surface of the outer conductor 220. Similar to the opening 704, the opening 754 allows fluid to move within the coaxial transmission line.

Similar to apparatus 700, with apparatus 750 installed on the coaxial transmission line, the dielectric member 710 can provide electrical isolation between the inner conductor 210 and the outer conductor 220 while the first conductive member 720 can provide heat conduction from the inner conductor 210 to the outer conductor 220. The second conductive member 730 can increase the mechanical strength of the apparatus 750.

In at least one embodiment, the second conductive member 730 can be mounted axially around the inner conductor 210 by a mechanical interlock. In at least one embodiment, the mechanical interlock can be threading on the inner surface 732 of the second conductive member 730 that is complementary to threading on an outer surface of the inner conductor 210. With threading, the inner surface 732 of the second conductive member can engage with the outer surface of the inner conductor 210. In some embodiments, the second conductive member 730 can be mounted axially around the inner conductor 210 by mechanically swaging the second conductive member 730 to compress the second conductive member 730 onto the inner conductor 210.

Figure 11C:
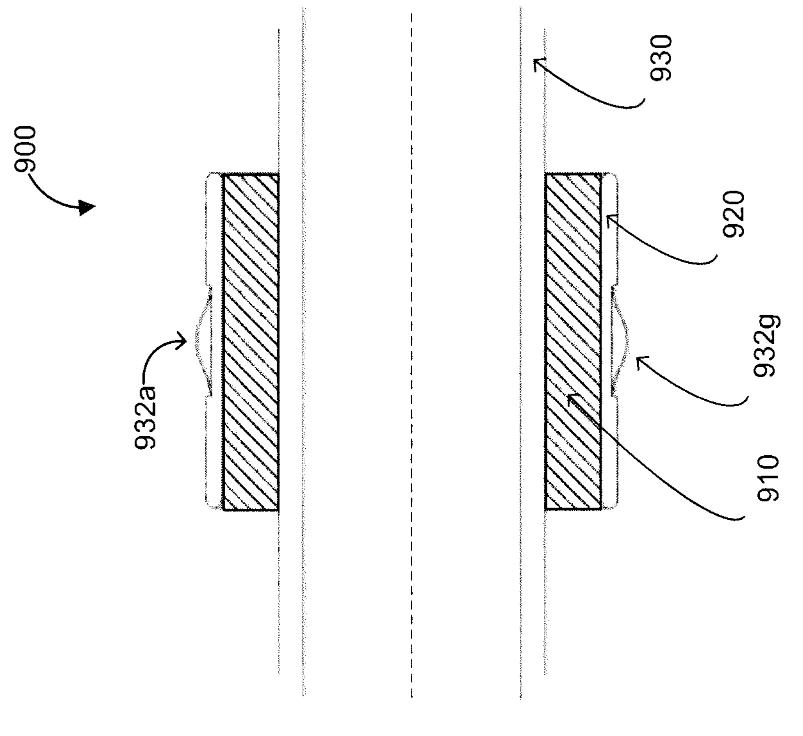
FIGS. 11C and 11D are profile and cross-sectional views of an apparatus for a coaxial transmission line, according to at least one embodiment.
Figure 11D:
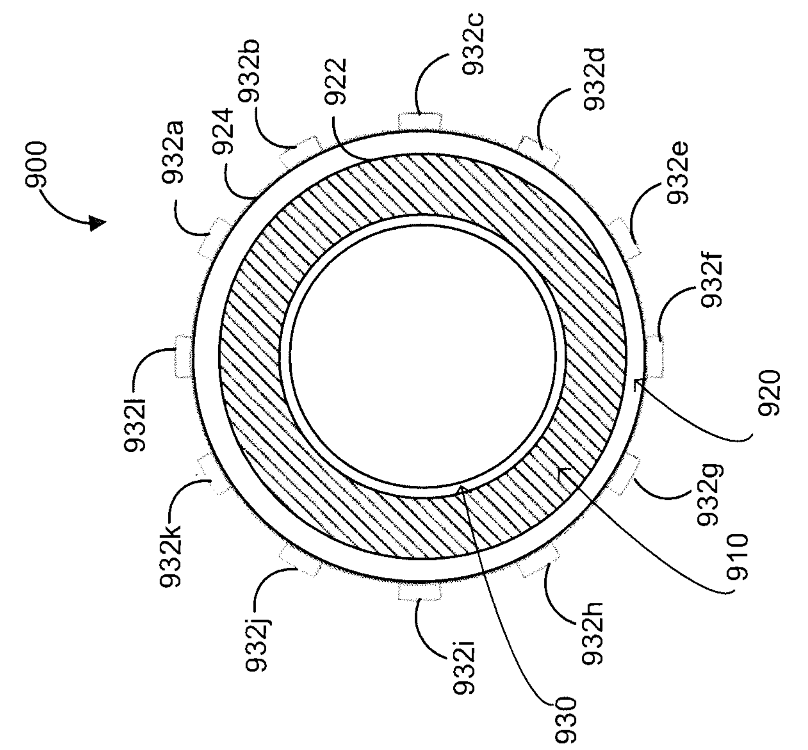

Referring to FIGS. 11C and 11D, shown therein are profile and cross-sectional views of an apparatus 900 for a coaxial transmission line, according to at least one embodiment. Similar to apparatus 750, apparatus 900 can include a dielectric member 910, a first conductive member 920, and a second conductive member 930. The first conductive member 920 can have an inner surface 922 that is proximal to the dielectric member 910. The first conductive member 920 also has an outer surface 924. The first conductive member 920 includes contact members 932*a* to 9321 (herein collectively referred to as contact members 932) mounted laterally on the outer surface 924 of the first conductive member 920 to maintain contact between the first conductive member 920 and the outer conductor 220.

As described above, when the coaxial transmission line is located in a substantially horizontal well, the weight of the coaxial transmission line can cause the outer first conductive member 920 to contact the outer conductor 220. That is, gravitational forces can cause the outer first conductive member 920 to contact the outer conductor 220. However, when the coaxial transmission line is situated in a substantially vertical well, the gravitational forces are in the same direction as the longitudinal axis of the coaxial transmission line.

If the first conductive member 920 is not in contact with the outer conductor 220, the outer conductor 220 can be a floating potential. The resulting capacitances between the outer conductor 200, first conductive member 920, and the inner conductor 210 can result in power losses, heat generation, and possibly even arcing. Thus, the provision of contact members 932 to ensure contact between the first conductive member 920 and the outer conductor 220 can be particularly advantageous for substantially vertical coaxial transmission lines.

As shown in FIGS. 11C and 11D, the contact members 932 can be spring members. FIGS. 11C and 11D is provided for illustration purposes only and other configurations are possible. For example, although twelve contact members 932 are shown in FIG. 11D, the apparatus 900 can include fewer or more contact members 932. In at least one embodiment, the apparatus 900 includes only one contact member 932. For example, the contact member 932 can be a garter spring.

Furthermore, both contact members 932*a* and 932*g* are shown in FIG. 11C as being centered with respect to the length of the first conductive member 920, that is, centered along the longitudinal axis between the first end and the second end. In at least one embodiment, the apparatus 900 can include one or more contact members 932 that are not centered between the first end and the second end. In addition, other spring members are possible. For example, the spring members shown in FIGS. 11C and 11D can be folded, or pinched, into the recessed portion and held in place by tension. Other attachment means, such as fastening or welding, are possible.

By ensuring contact between the first conductive member 920 and the outer conductor 220, contact members 932 can improve the electrical contact between the first conductive member 920 and the outer conductor 200. In addition, contact members 932 can increase heat conduction between the apparatus 900 and the outer conductor 200. In at least one embodiment, the contact members 932 can be formed of a material having high thermal conductivity and electrical conductivity properties. For example, the contact members 932 can be formed of beryllium copper, graphite, or any combination thereof.

In at least one embodiment, the contact members 932 can be formed of a soft material to avoid scratching of the outer conductor 200. Scratching of the outer conductor 200 can produce metal shards in the coaxial transmission line, which can increase the risk of an arcing event. The material of the spring members may also be pliable enough to permit folding of the spring members for installation, as described above.

Figure 12:
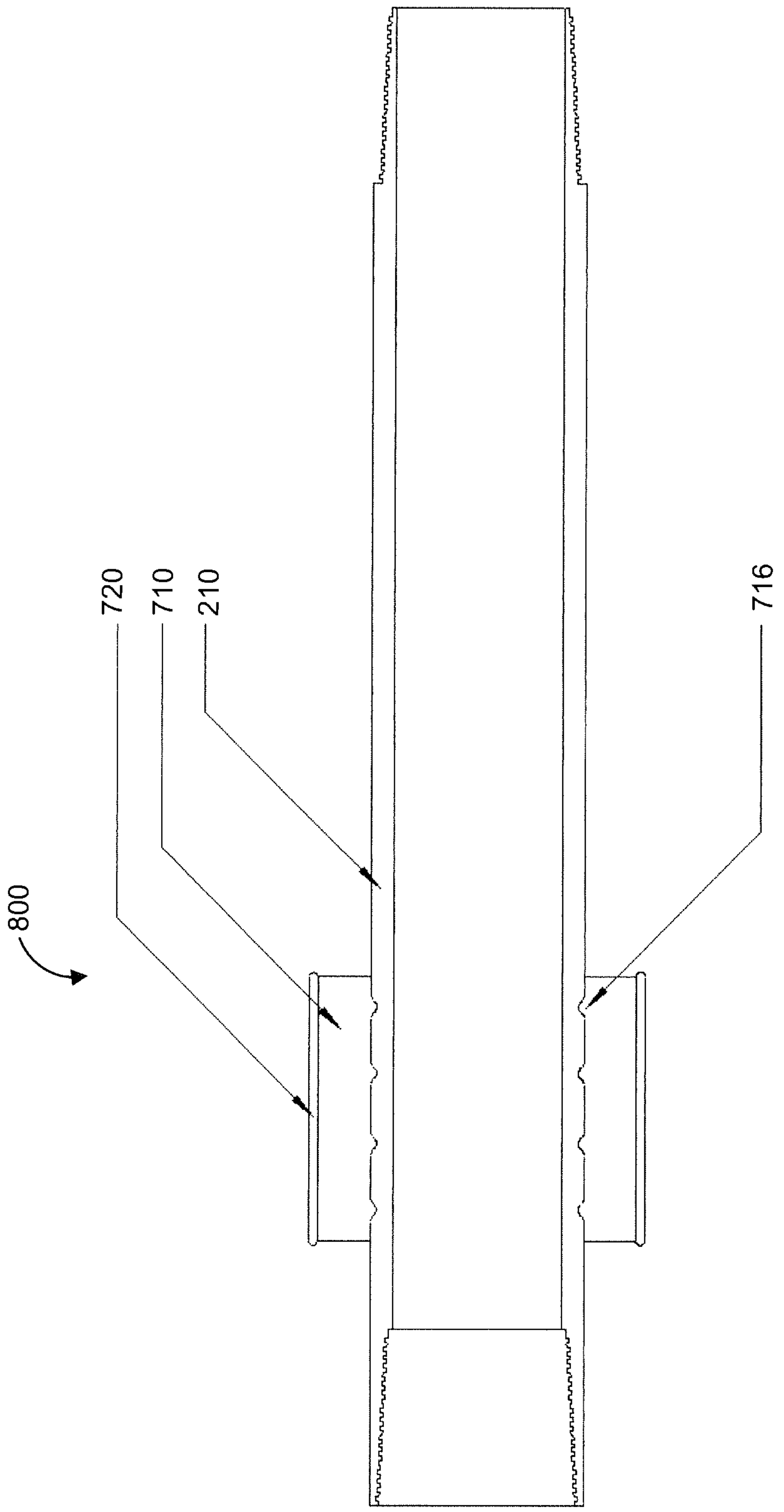
FIG. 12 is a profile view of an apparatus installed on a coaxial transmission line with a mechanical interlock, according to at least one other embodiment.

Referring now to FIG. 12, shown therein is a profile view of the apparatus 800 installed on a coaxial transmission line with a mechanical interlock 716, according to at least one other embodiment. FIG. 12 shows a single module of a modular inner conductor. The modular inner conductor can be formed of individual modules that connect lengthwise.

The shape of the first end and second end of the apparatus 700 can affect the electric field. In at least one embodiment, the at least one of the first end and the second end of the first conductive member 720 is round. Furthermore, the radius of curvature can be large to further minimize the edge effect.

Figure 13A:
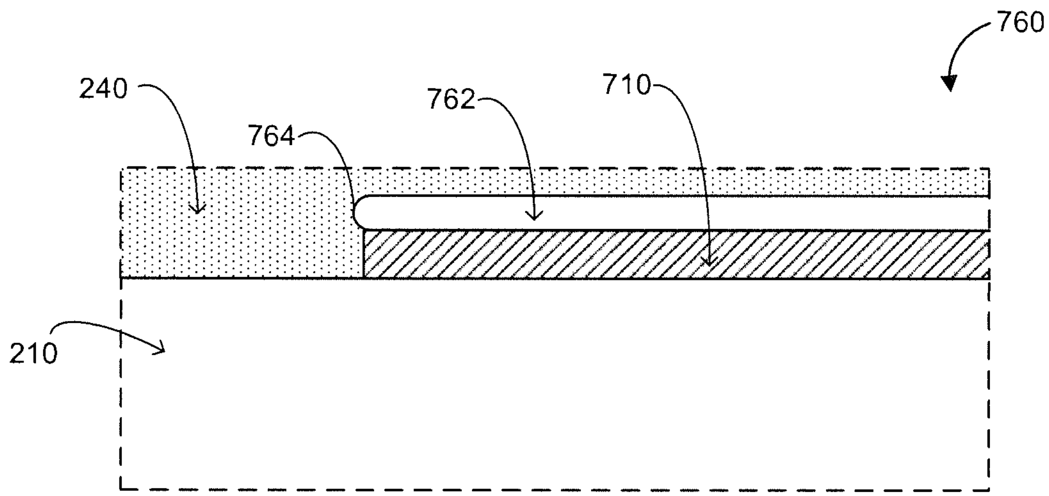
FIG. 13A is an enlarged profile view of a first conductive member having an end that overhangs a dielectric member of an apparatus for a coaxial transmission line, according to at least one embodiment.

Referring now to FIG. 13A, shown therein is an enlarged profile view of a first conductive member 762 of an apparatus 760, according to at least one embodiment. As shown in FIG. 13A, the first conductive member 762 can have an end 764 that is rounded since sharp edges can generate a large edge effect. Furthermore, as shown in FIG. 13A, the end 764 can overhang the dielectric member 710. That is, at end 764, the end face of the first conductive member 762 can extend further along the longitudinal axis than the end face of the dielectric member 710.

Figure 14A:
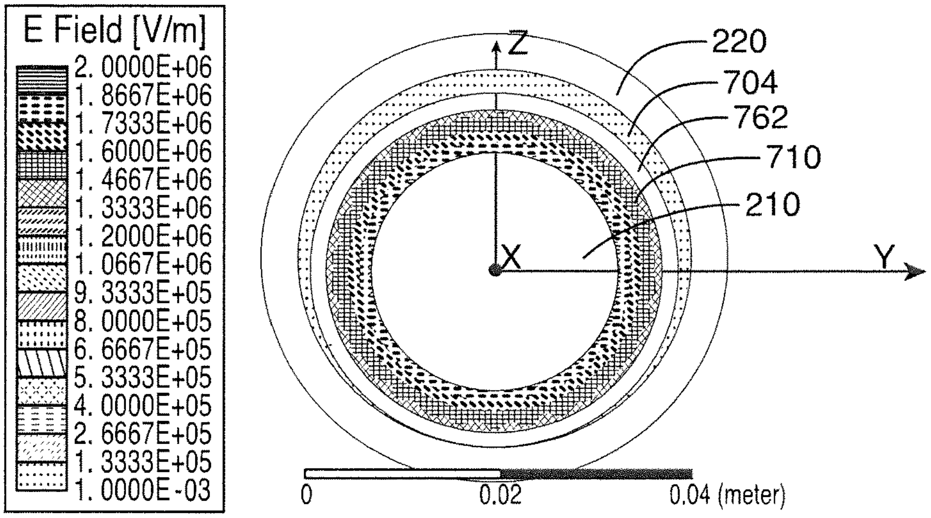
FIGS. 14A, 14B, and 14C are cross-sectional, profile, and enlarged profile views of electric field simulations of the apparatus of FIG. 13A.
Figure 14B:
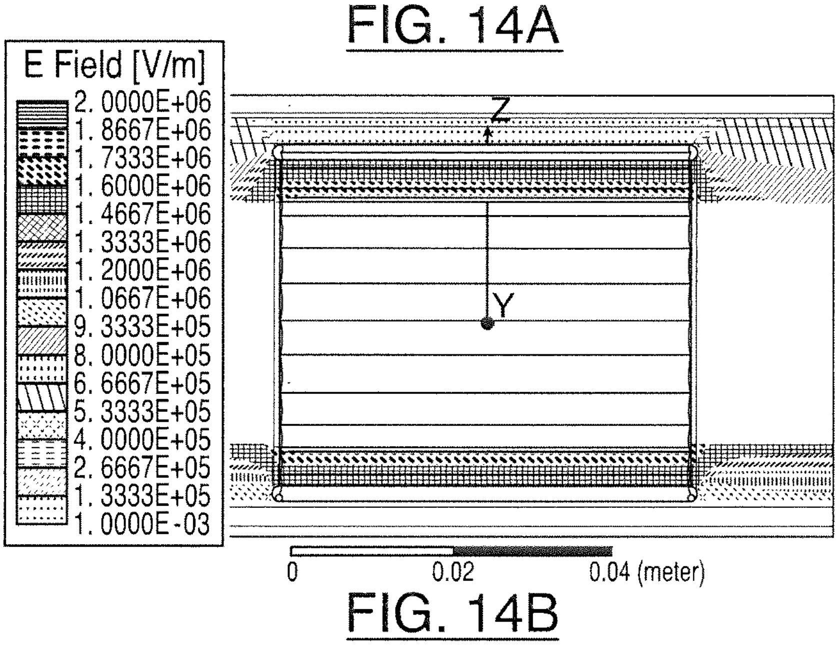
Figure 14C:
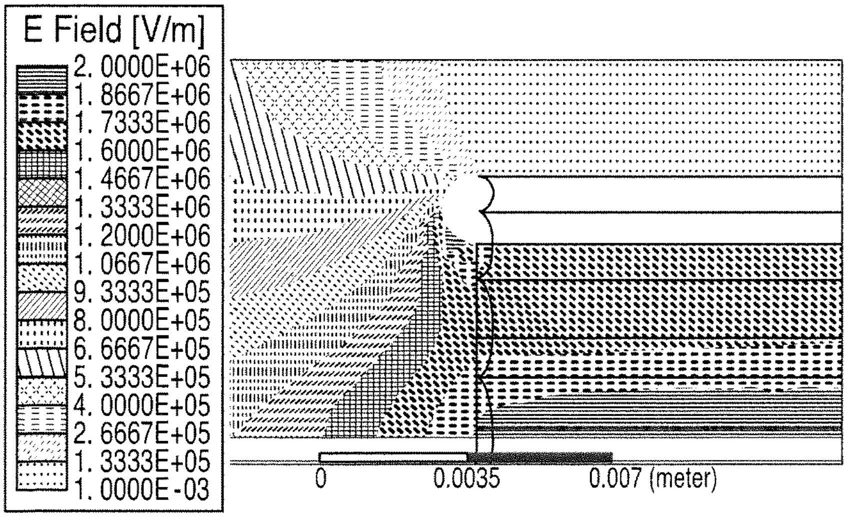

Referring now to FIGS. 14A, 14B, and 14C are cross-sectional, profile, and enlarged profile views of electric field simulations of the apparatus 760 of FIG. 13A. Similar to that of apparatus 700, no substantial electric field is generated within the opening 704. However, as can be seen in FIG. 14A, the electric field along the length of the apparatus 760 ranges from about 2.0E6 near the inner conductor 210 to about 1.3E6 near the outer conductor 220. That is, strong electric fields can be generated around the end face of the dielectric member 710 when the first conductive member 762 overhangs the dielectric member 710.

Figure 13B:
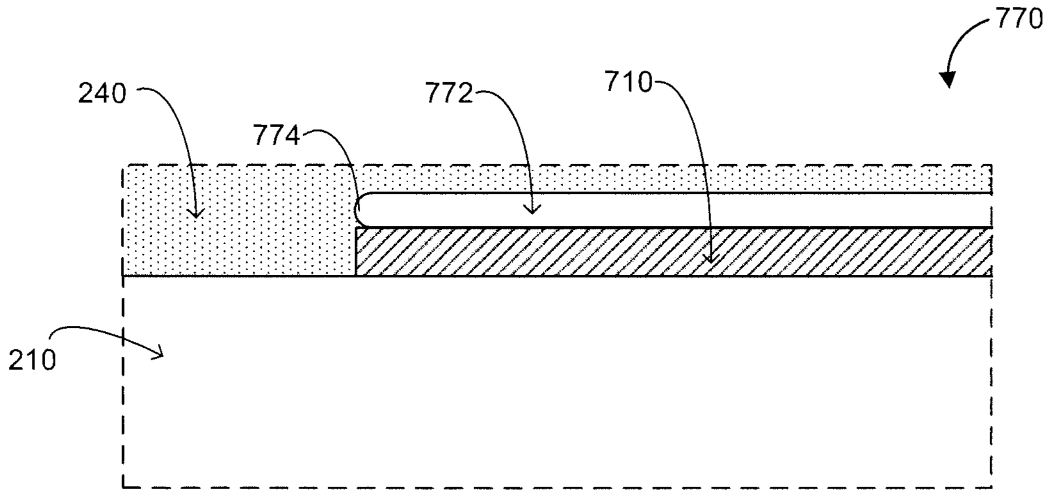
FIG. 13B is an enlarged profile view of a first conductive member having an end face that is flush with a dielectric member of an apparatus for a coaxial transmission line, according to at least one embodiment.

Referring now to FIG. 13B, shown therein is an enlarged profile view of a first conductive member 772 of an apparatus 770, according to at least one embodiment. As shown in FIG. 13B, the first conductive member 772 can have an end 774 that is flush with the end of the dielectric member 710. At end 774, the first conductive member 772 can extend to substantially the same point along the longitudinal axis as the dielectric member 710. That is, at end 774, the end face of the first conductive member 772 can be flush with the end face of the dielectric member 710. This is different from the apparatus 760, in which the first conductive member 762 can extend further along the longitudinal axis than the dielectric member 710.

Figure 15A:
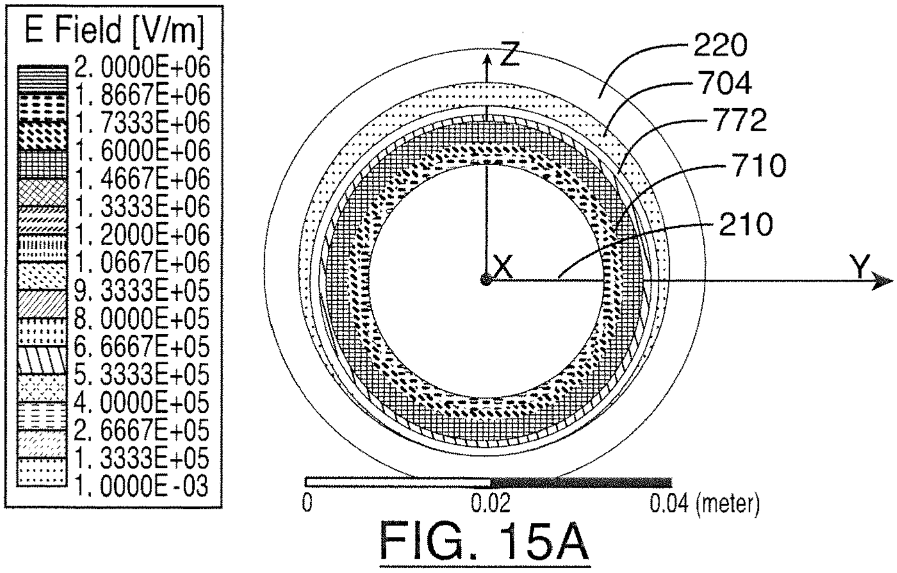
FIGS. 15A, 15B, and 15C are cross-sectional, profile, and enlarged profile views of electric field simulations of the apparatus of FIG. 13B.
Figure 15B:
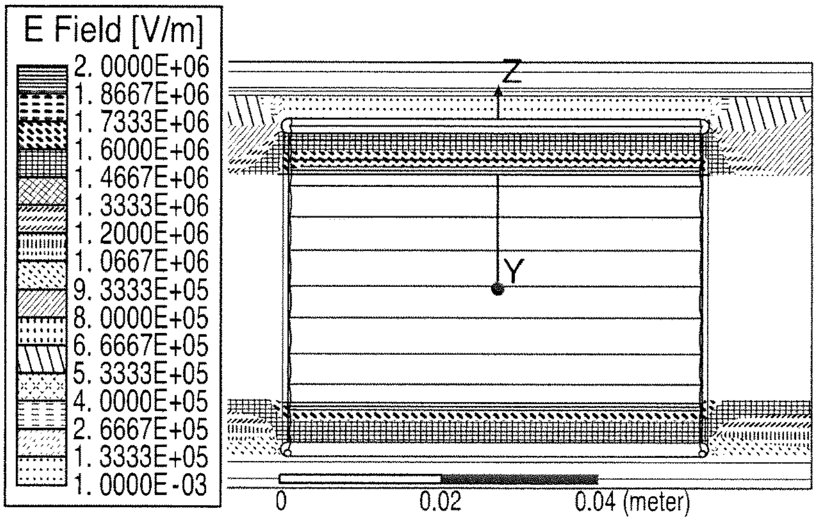
Figure 15C:
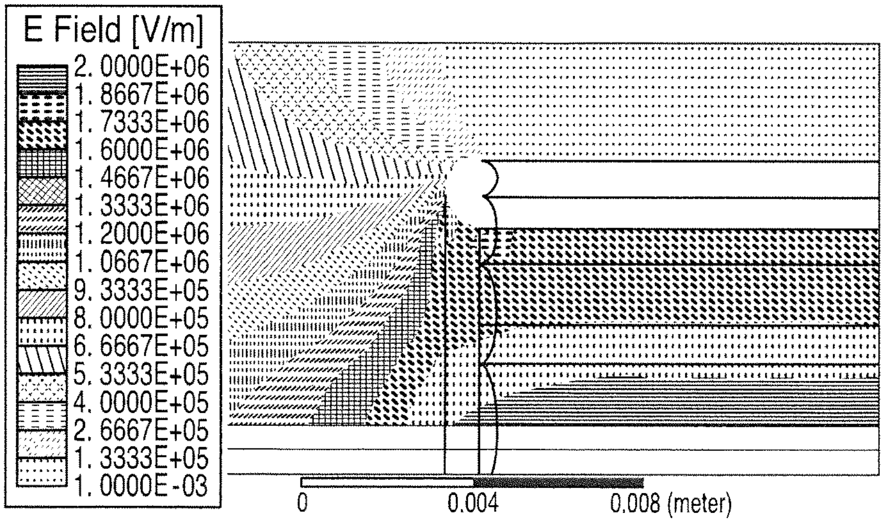

Referring now to FIGS. 15A, 15B, and 15C are cross-sectional, profile, and enlarged profile views of electric field simulations of the apparatus 770 of FIG. 13B. Similar to that of apparatus 700 and 760, no substantial electric field is generated within the opening 704. However, as can be seen in FIG. 15A, the electric field along the length of the apparatus 770 ranges from about 2.0E6 near the inner conductor 210 to about 1.4E6 near the outer conductor 220.

As shown in FIGS. 14C and 15C, electric fields generated around the end face of the dielectric member 710 by a first conductive member 772 that is flush with the dielectric member 710 can be less than the electric fields generated around the end face of the dielectric member 710 by an overhanging first conductive member 762. That is, the shape of the first end and the second end of the first conductive member 720 can affect the electric field generated by the apparatus.

Figure 16A:
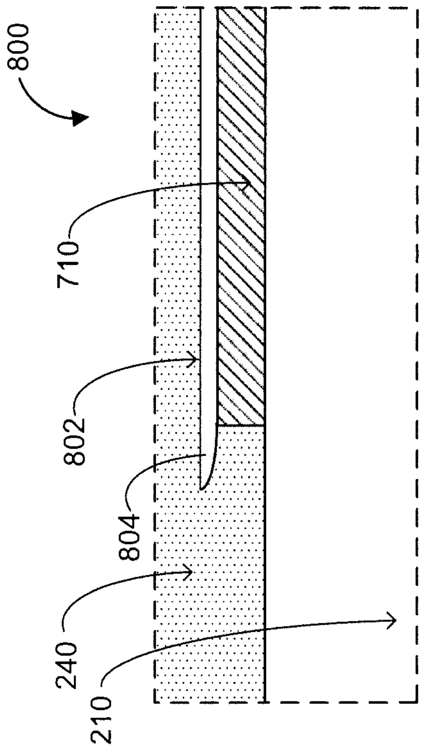
FIG. 16A is a profile view of a first conductive member of an apparatus for a coaxial transmission line having an end defined by a large radius of curvature, according to at least one embodiment.
Figure 16B:
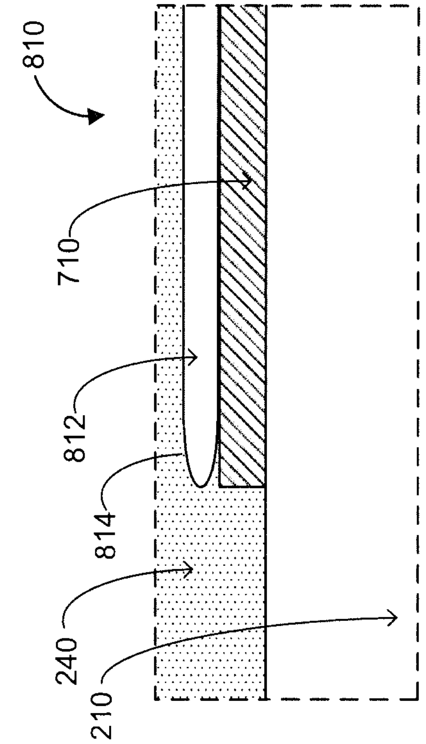
FIG. 16B is a profile view of a first conductive member of an apparatus for a coaxial transmission line having an end face defined by a large radius of curvature that is flush with a dielectric member, according to at least one embodiment.

Referring now to FIGS. 16A and 16B, shown therein are profile views of a first conductive member 802 of apparatus 800 and a first conductive member 812 of apparatus 810, according to some embodiments. Similar to the first conductive member 762 of apparatus 760 in FIG. 13A, the first conductive member 802 of apparatus 800 in FIG. 16A can extend further along the longitudinal axis than the dielectric member 710. Similar to the first conductive member 772 of apparatus 770 in FIG. 13B, the first conductive member 812 of apparatus 810 in FIG. 16B can be flush with the dielectric member 710.

The first conductive members 802 and 812 can have ends 804 and 814 defined by a large radius of curvature. As noted above, sharp edges can increase the electric field that is generated. That is, the edge effect of apparatus 700 can be reduced by the first conductive members 802 and 812 having a large radius of the curvature as illustrated in FIGS. 16A and 16B.

Figure 16C:
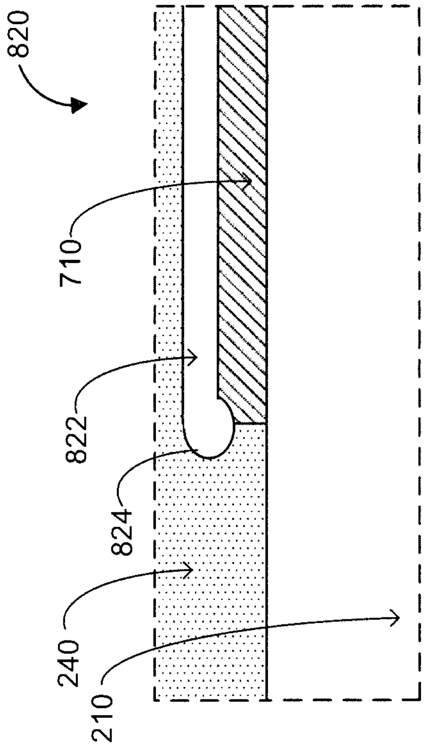
FIG. 16C is a profile view of a first conductive member of an apparatus for a coaxial transmission line having a rim, according to at least one embodiment.

Referring now to FIG. 16C, shown therein is a profile view of a first conductive member 822 of apparatus 820, according to at least one other embodiment. The first conductive member 822 can have an end 824 with a rim protruding towards the dielectric member 710. The rim protruding towards the dielectric member 710 can force the electric field to be aligned with the boundary of the apparatus 820 and the annular space 240. That is, the rim protruding towards the dielectric member 710 can force the electric field to be aligned with the end face of the dielectric member 710. Hence, the electric field enhancement generated by the apparatus 820 can be reduced.

In some embodiments, an end of the dielectric member 710 is substantially orthogonal to the longitudinal axis, as shown in FIGS. 7A, 8A, 10A, 11A, 13A, 13B, and 16A to 16C.

Figure 16D:
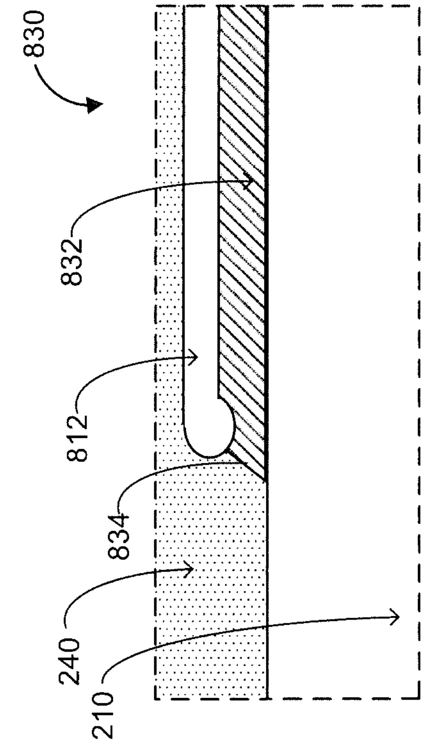
FIG. 16D is a profile view of a first conductive member of an apparatus for a coaxial transmission line having a dielectric member that is non-orthogonal to the longitudinal axis, according to at least one embodiment.

Referring now to FIG. 16D, shown therein is a profile view of a dielectric member 832 of an apparatus 830 for a coaxial transmission line having an end that is non-orthogonal to the longitudinal axis, according to at least one embodiment.

Figure 17A:
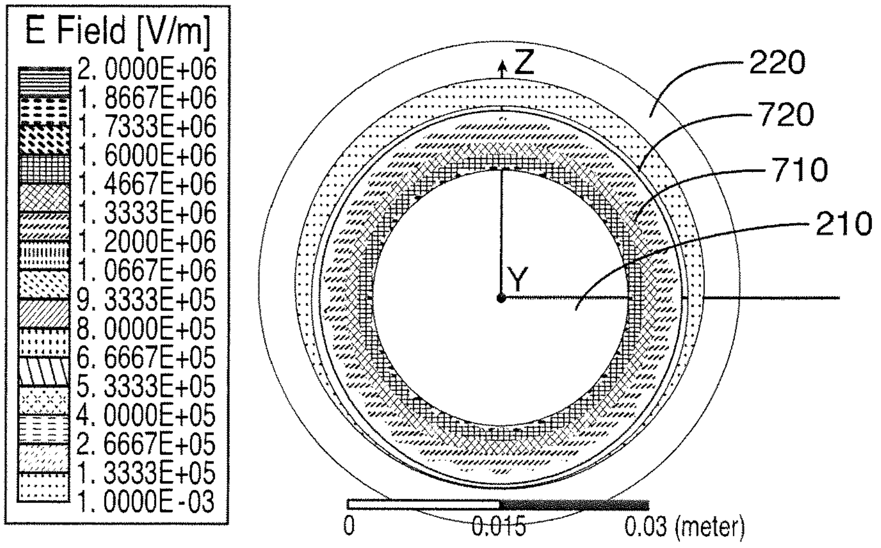
FIGS. 17A, 17B, and 17C are cross-sectional, profile, and enlarged profile views of electric field simulations of the apparatus of FIG. 16A.
Figure 17B:
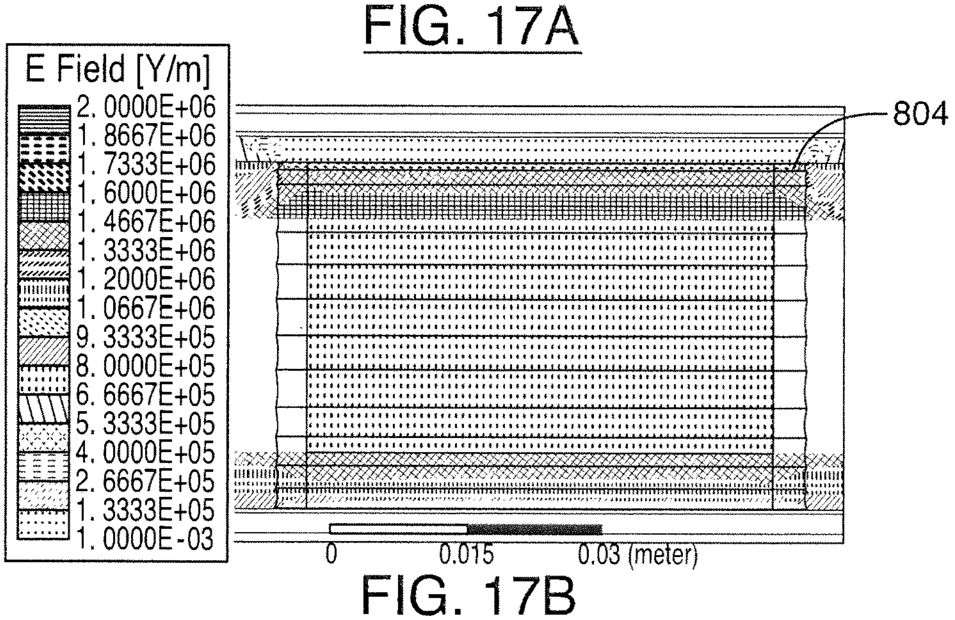
Figure 17C:
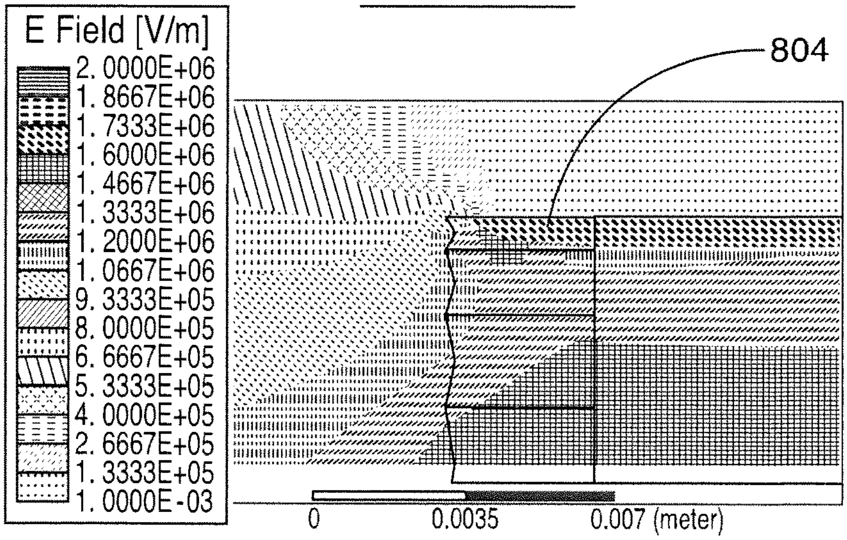

Referring to FIGS. 17A, 17B, and 17C are cross-sectional, profile, and enlarged profile views of electric field simulations of the apparatus 800 of FIG. 16A. As can be seen in FIG. 17A, the electric field along the length of the apparatus 800 ranges from about 1.7E6 near the inner conductor 210 to about 8E5 near the outer conductor 220.

Figure 18A:
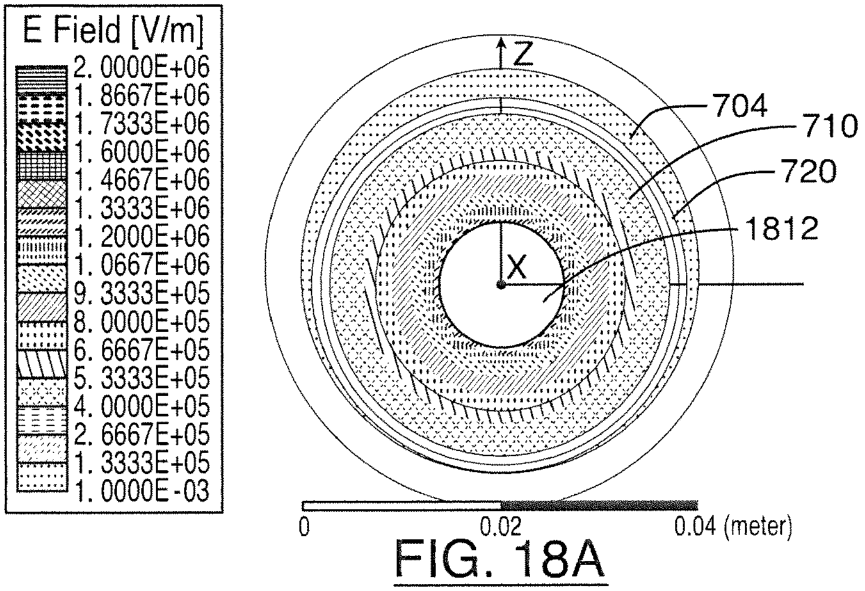
FIGS. 18A, 18B, and 18C are cross-sectional, profile, and enlarged profile views of electric field simulations of an apparatus installed on a coaxial transmission line having an inner conductor module with a double-frustum shape.
Figure 18B:
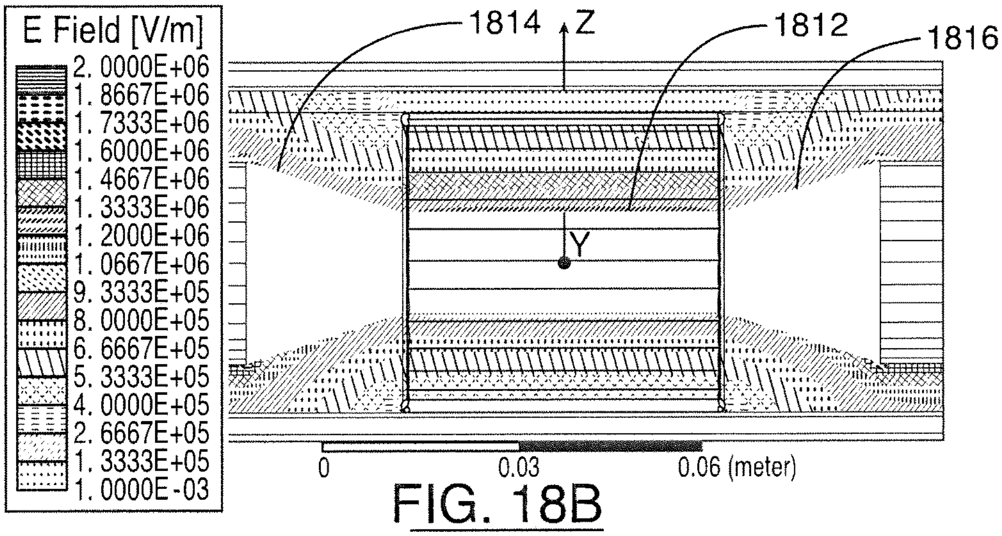
Figure 18C:
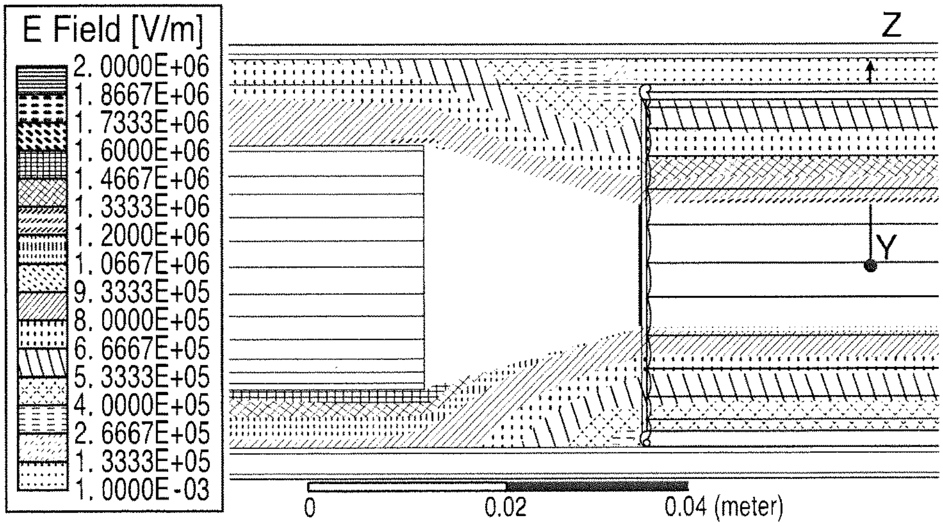

Referring now to FIGS. 18A, 18B, and 18C are cross-sectional, profile, and enlarged profile views of electric field simulations of an apparatus, according to at least one other embodiment, installed on a coaxial transmission line having an inner conductor module 1810 with a double-frustum shape.

In at least one embodiment, an inner conductor module 1810 can include a first end portion 1814, a middle portion 1812, and a second end portion 1816. The middle portion 1812 of the inner conductor module 1810 can have a first diameter, and each of the first end portion and the second end portion can have a frustum shape with a minimum diameter that is larger than the first diameter of the middle portion 1812. The shape of such an inner conductor module 1810 is herein referred to as a double-frustum. In this case, the dielectric member 710 can be mounted around the middle portion 1812 of the inner conductor module 1810.

As shown in FIGS. 18A to 18C, a significant reduction of the edge effect can be achieved. The stronger electric fields caused by the reduced circumference of the coaxial transmission line, namely the first perimeter defined by the cross-section of the outer surface 724 of the first conductive member 720 (described in relation to FIGS. 9A to 9C) can be compensated for by a middle portion 1812 of the inner conductor module 1810 having a smaller diameter.

There are limits in how much a smaller diameter of the middle portion 1812 of the inner conductor module 1810 can compensate. Below a threshold value, the electric field at the inner conductor 1810 can increase. This is particularly important at the boundary of the dielectric member 710 and the opening 704 and/or annular space 240, along the first and second end portions 1814 and 1816, because the dielectric member 710 typically has a higher dielectric strength than the substance in the annular space 240.

The maximum electric field strength at an outer surface of the inner conductor 1810 at the middle portion 1812 can be determined using equation (1):

$$E_{max}=V_0/a\ \ln(b/a) \tag{1}$$

In equation (1), $V_0$ is the voltage between the outer surface of the inner conductor 1810 at the middle portion 1812 and the first conductive member 720, a is the radii of the outer surface of the inner conductor 1810 at the middle portion 1812, and b is the radii of the first conductive member 720. Equation (1) has a minimum when ln(b/z)=1, or when b/a is approximately 2.7. The maximum power handling of a coaxial transmission line can occur when ln(b/a)=0.5, or when b/a is approximately 1.65. At this power, the electric field at the outer surface of the inner conductor 1810 at the middle portion 1812 is about 22% higher.

The smaller diameter of the middle portion 1812 of the inner conductor module 1810 can have an additional advantage of increasing the characteristic impedance of the apparatus 700, which may be decreased by the material and diameter of the dielectric member 710. Thus, the smaller diameter of the middle portion 1812 of the inner conductor module 1810 can reduce potential reflections, and further compensate for inductances created by the larger diameter of the end portions 1814 and 1816 of the inner conductor 1810 on both sides of the apparatus 700.

It will be understood that while end portions 1814 and 1816 of the inner conductor module 1810 are shown in FIG. 18B as abrupt angle changes, this is for illustration purposes only. In practice, the inner conductor module 1810 may have rounded edges to avoid increased electric fields on wedge shapes.

In at least one embodiment, a coaxial transmission line can be provided with the apparatus 700 installed therein. That is, the coaxial transmission line can include an inner conductor section 210 defining a longitudinal axis; a dielectric member 710 mounted around a portion of the inner conductor section 210 along the longitudinal axis; a first conductive member 720 mounted axially around the dielectric member 710, and an outer conductor section 220. The first conductive member 720 can have an outer surface 724 and a cross-section of the outer surface that is orthogonal to the longitudinal axis can define a first perimeter. The outer conductor section 220 can have an inner surface defining a bore through which the first conductive member 720 can be inserted. A cross-section of the inner surface of the outer conductor section 220 that is orthogonal to the longitudinal axis can define a second perimeter. The first perimeter can be smaller than the second perimeter and thereby provide clearance 704 along the longitudinal axis between a portion of the outer surface 724 of the first conductive member 720 and the inner surface of the outer conductor 220 of the coaxial transmission line when the first conductive member 720 is inserted through the bore.

In at least one embodiment, the coaxial transmission line can be partially preassembled. For example, the inner conductor 210 have the apparatus 700 installed thereon. During deployment of the coaxial transmission line, the outer conductor 220 is deployed first, followed by insertion of the inner conductor 210 in the outer conductor 220.

In at least one example, the apparatus 700 can be installed thereon by first installing the dielectric member 710 on the inner conductor 210 and then compressing and locking the first conductive member 720 onto the dielectric member 710. In at least one embodiment, the dielectric member 710 can be split axially for installation. Axially splitting the dielectric member 710 may be necessary when installing the apparatus on the inner conductor 1810 with a double-frustum shape.

Figure 19A:
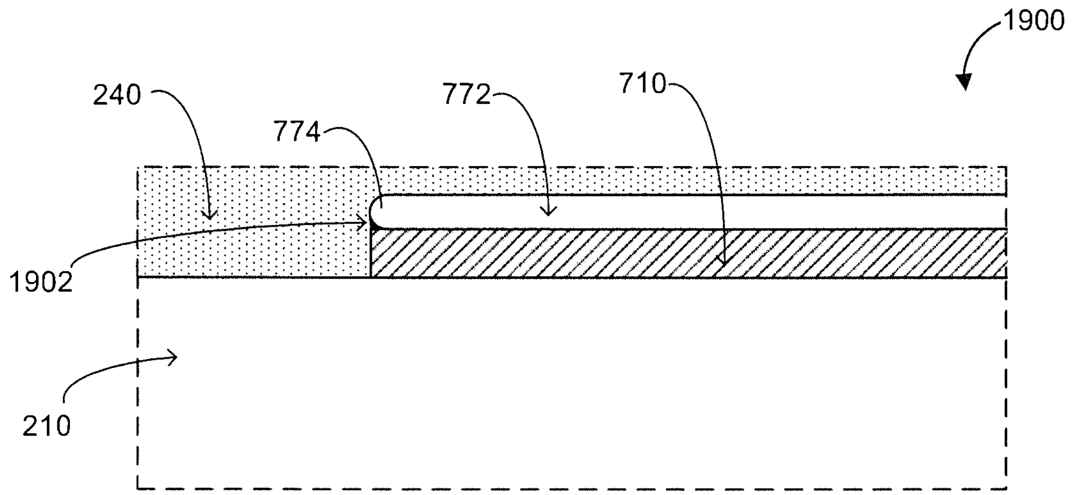
FIG. 19A is a profile view of an apparatus for a coaxial transmission line having a dielectric filler applied to an indentation at the interface between the first conductive member and the dielectric member, according to at least one embodiment.

Referring now to FIG. 19A, shown therein is a profile view of a first conductive member 722 of an apparatus 1900 for a coaxial transmission line having a dielectric filler 1902, according to at least one embodiment. Similar to apparatus 770 of FIG. 13B, apparatus 1900 has a first conductive member 772 with an end 774 that is flush with the end of the dielectric member 710. As shown in FIG. 13B, the interface between the first conductive member 772 and the dielectric member 710 at the end face can include an indentation, or recess, due to the rounded edge of the first conductive member 772. As shown in FIG. 19A, the dielectric filler 1902 can be applied to the indentation or recess to provide a smooth end face.

Figure 19B:
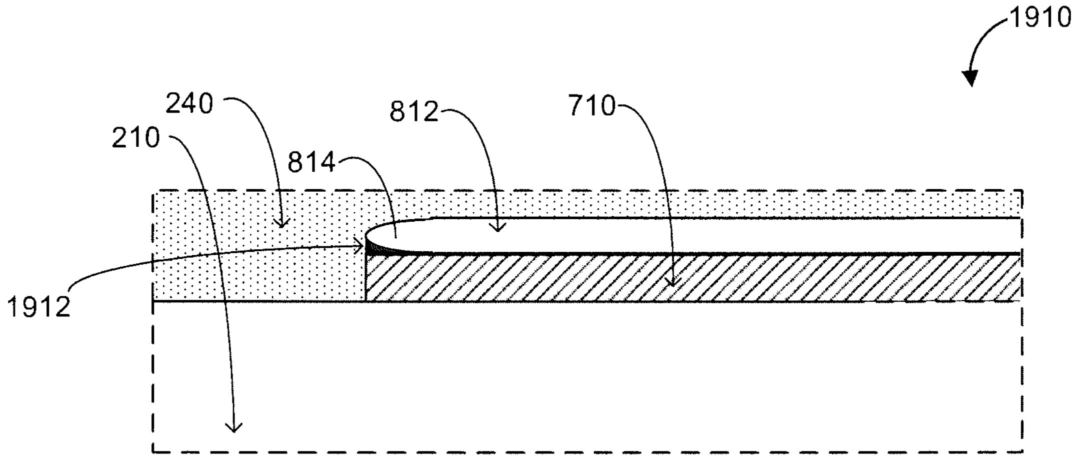
FIG. 19B is a profile view of another apparatus for a coaxial transmission line having a dielectric filler applied to an indentation at the interface between the first conductive member and the dielectric member, according to at least one embodiment.

Referring now to FIG. 19B, shown therein is a profile view of a first conductive member 812 of an apparatus 1910 for a coaxial transmission line having a dielectric filler 1912, according to at least one embodiment. Similar to apparatus 810 of FIG. 16B, apparatus 1910 has a first conductive member 812 that has an end face defined by a large radius of curvature that is flush with a dielectric member 710. As shown in FIG. 16B, the interface between the first conductive member 812 and the dielectric member 710 at the end face can include an indentation, or recess, due to the rounded edge of the first conductive member 812. Similar to the apparatus 1900 of FIG. 19A, the dielectric filler 1912 can be applied to the indentation to provide a smooth end face.

Dielectric fillers 1902 and 1912 can be formed of insulating material, and preferably has similar properties as dielectric member 710. For example, in at least one embodiment, the fillers 1902 and 1912 are formed of a material having a high thermal conductivity, such as boron nitride.

Figure 20:
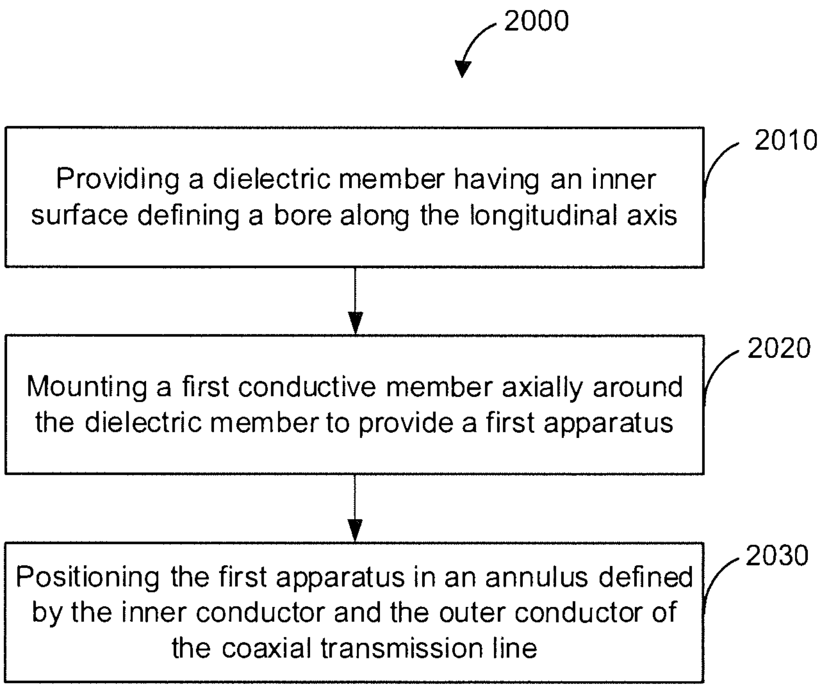
FIG. 20 is a flowchart of a method for installing an apparatus on a coaxial transmission line, according to at least on embodiment.

Referring now to FIG. 20, shown therein is a flowchart of a method 2000 for installing an apparatus on a coaxial transmission line, according to at least on embodiment. The coaxial transmission line has an inner conductor 210 surrounded by an outer conductor 220 along a longitudinal axis of the inner conductor 210, and an annular space, or annulus, 240 between the inner conductor 210 and the outer conductor 220.

At 2010, the method can involve providing a dielectric member 710 having an inner surface defining a bore along the longitudinal axis.

Next, at 2020, the method can involve mounting a first conductive member 720 axially around the dielectric member 710 to provide a first apparatus 700. The first conductive member 720 can have an outer surface 724. A first perimeter can be defined by a cross-section of the outer surface 724 of the first conductive member 720 that is orthogonal to the longitudinal axis of the coaxial transmission line. A second perimeter can be defined by a cross-section of an inner surface of the outer conductor 220 of the coaxial transmission line that is orthogonal to the longitudinal axis of the coaxial transmission line.

In at least one embodiment, the inner surface 712 of the dielectric member 710 can include threading that is complementary to threading on the outer surface of the inner conductor 210 of the coaxial transmission line. When such threading is provided, mounting the first apparatus 700 around the inner conductor 210 of the coaxial transmission line can involve rotating the first apparatus 700 with respect to the inner conductor 210 of the coaxial transmission to engage the complementary threading.

Next, at 2030, the method can involve positioning the first apparatus 700 in the annulus 240 of the coaxial transmission line, that is, the annular space 240 defined by the inner conductor 210 and the outer conductor 220.

In at least one embodiment, the positioning the first apparatus 700 in an annulus 240 defined by the inner conductor and the outer conductor of the coaxial transmission line can involve mounting the first apparatus 700 around the inner conductor 210 of the coaxial transmission line and inserting the inner conductor 210 of the coaxial transmission line, with the first apparatus 700 mounted thereon, in the outer conductor 220 of the coaxial transmission line.

A perimeter of the first apparatus 700 defined by the outer surface 724 of the first conductive member 720 is smaller than the perimeter of the inner surface of the outer conductor 220. Accordingly, when the first apparatus 700 is positioned in the annulus 240, clearance is provided along the longitudinal axis between a portion of the outer surface 724 of the first conductive member 720 and the inner surface of the outer conductor 220 of the coaxial transmission line.

Use of high power EM energy to heat underground hydrocarbon formations, as well as for remediation purposes, can require the transmission of high power, high Poynting vector (e.g., high power density), EM waves in a transmission line. The subject matter disclosed herein can also apply to any other application involving high power RF transmission through coaxial transmission lines. In at least one embodiment, the apparatus 700 can be used in power transmission lines to provide insulation from metal.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An apparatus for a coaxial transmission line having an outer conductor surrounding an inner conductor along a longitudinal axis of the inner conductor, the apparatus comprising:

a cylinder-shaped dielectric member having an outer surface and an inner surface, the inner surface of the dielectric member defining a bore along the longitudinal axis;

a first conductive member mounted around the outer surface of the dielectric member, the first conductive member extending along the longitudinal axis thereby having a first end and a second end, the first conductive member having a continuous inner surface from the first end to the second end, a cross-section of an outer surface of the first conductive member being orthogonal to the longitudinal axis and defining a first perimeter, a cross-section of an inner surface of the outer conductor of the coaxial transmission line being orthogonal to the longitudinal axis and defining a second perimeter that is larger than the first perimeter; and a plurality of contact members mounted on the outer surface of the first conductive member, the plurality of contact members being spaced apart around the first perimeter;

wherein when the apparatus is positioned in an annulus defined by the inner conductor and the outer conductor of the coaxial transmission line:

the plurality of contact members is in electrical contact with the inner surface of the outer conductor;

spacing between the plurality of contact members around the first perimeter provides clearance between the outer surface of the first conductive member and the inner surface of the outer conductor, the clearance extending from the first end to the second end of the first conductive member; and the dielectric member and the first conductive member extend along only a portion of the length of the outer conductor.

2. The apparatus of claim 1, wherein the plurality of contact members is conductive.

3. The apparatus of claim 1, wherein the plurality of contact members is equally spaced around the first perimeter for maintaining the apparatus in a position such that the first perimeter is concentric with the second perimeter.

4. The apparatus of claim 1, wherein the plurality of contact members comprises one or more of spring members and brushes.

5. The apparatus of claim 1, wherein the dielectric member comprises a plurality of layers.

6. The apparatus of claim 1, further comprising a second conductive member lining the inner surface of the dielectric member.

7. A method of providing a coaxial transmission line having an outer conductor surrounding an inner conductor along a longitudinal axis of the inner conductor, the method comprising:

providing a cylinder-shaped dielectric member having an outer surface and an inner surface, the inner surface of the dielectric member defining a bore along the longitudinal axis;

mounting a first conductive member around the outer surface of the dielectric member to provide a first apparatus, the first conductive member extending along the longitudinal axis thereby having a first end and a second end, the first conductive member having a continuous inner surface from the first end to the second end, a cross-section of an outer surface of the first conductive member being orthogonal to the longitudinal axis and defining a first perimeter, a cross-section of an inner surface of the outer conductor of the coaxial transmission line being orthogonal to the longitudinal axis and defining a second perimeter that is larger than the first perimeter;

mounting a plurality of contact members on the outer surface of the first conductive member, the plurality of contact members being spaced apart around the first perimeter; and positioning the first apparatus in an annulus defined by the inner conductor and the outer conductor of the coaxial transmission line;

wherein:

the plurality of contact members is in electrical contact with the inner surface of the outer conductor;

spacing between the plurality of contact members around the first perimeter provides clearance between the outer surface of the first conductive member and the inner surface of the outer conductor of the coaxial transmission line, the clearance extending from the first end to the second end of the first conductive member; and the dielectric member and the first conductive member extend along only a portion of the length of the outer conductor.

8. The method of claim 7, wherein said positioning the first apparatus in an annulus defined by the inner conductor and the outer conductor of the coaxial transmission line comprises:

mounting the first apparatus around the inner conductor of the coaxial transmission line; and inserting the inner conductor of the coaxial transmission line, with the first apparatus mounted thereon, in the outer conductor of the coaxial transmission line.

9. The method of claim 8, wherein the plurality of contact members is conductive.

10. The method of claim 8, wherein the plurality of contact members is equally spaced around the first perimeter for maintaining the first apparatus in a position such that the first perimeter is concentric with the second perimeter.

11. The method of claim 8, wherein the plurality of contact members comprises one or more spring members and brushes.

12. The method of claim 11, further comprising depressing the plurality of contact members prior to inserting the inner conductor of the coaxial transmission line with the first apparatus mounted thereon, in the outer conductor of the coaxial transmission line.

13. The method of claim 7, wherein said providing a dielectric member comprises providing a plurality of dielectric layers.

14. The method of claim 8, further comprising lining the inner surface of the dielectric member with a second conductive member.

15. A coaxial transmission line comprising:

an inner conductor section defining a longitudinal axis;

a cylinder-shaped dielectric member mounted around a portion of the inner conductor section along the longitudinal axis;

a first conductive member mounted around an outer surface of the dielectric member, the first conductive member extending along the longitudinal axis thereby having a first end and a second end, the first conductive member having a continuous inner surface from the first end to the second end, a cross-section of an outer surface of the first conductive member being orthogonal to the longitudinal axis and defining a first perimeter;

a plurality of contact members mounted on the outer surface of the first conductive member, the plurality of contact members being spaced apart around the first perimeter; and an outer conductor section, the outer conductor section having an inner surface defining a bore through which the first conductive member can be inserted, a cross-section of the inner surface of the outer conductor section being orthogonal to the longitudinal axis and defining a second perimeter that is larger than the first perimeter;

wherein when the first conductive member is inserted through the bore:

the plurality of contact members is in electrical contact with the inner surface of the outer conductor section;

spacing between the plurality of contact members around the first perimeter provides clearance between the outer surface of the first conductive member and the inner surface of the outer conductor section, the clearance extending from the first end to the second end of the first conductive member; and the dielectric member and the first conductive member extend along only a portion of the length of the outer conductor.

16. The coaxial transmission line of claim 15, wherein the plurality of contact members is conductive.

17. The coaxial transmission line of claim 15, wherein the plurality of contact members is equally spaced around the first perimeter for maintaining the first conductive member in a position such that the first perimeter is concentric with the second perimeter.

18. The coaxial transmission line of claim 15, wherein the plurality of contact members comprises one or more spring members and brushes.

19. The coaxial transmission line of claim 15, wherein the dielectric member comprises a plurality of layers.

20. The coaxial transmission line of claim 15, further comprising a second conductive member lining the inner surface of the dielectric member.

* * * * *